US010808954B2

(12) United States Patent
Gumaer

(10) Patent No.: US 10,808,954 B2
(45) Date of Patent: Oct. 20, 2020

(54) VEHICLE EXHAUST REMOVAL SYSTEM FOR BUILDINGS AND METHOD OF CONTROL

(71) Applicant: Lennard A. Gumaer, Bloomfield Hills, MI (US)

(72) Inventor: Lennard A. Gumaer, Bloomfield Hills, MI (US)

( * ) Notice: Subject to any disclaimer, the term of this patent is extended or adjusted under 35 U.S.C. 154(b) by 429 days.

(21) Appl. No.: 14/611,916

(22) Filed: Feb. 2, 2015

(65) Prior Publication Data

US 2015/0219350 A1 Aug. 6, 2015

Related U.S. Application Data

(60) Provisional application No. 61/934,710, filed on Feb. 1, 2014.

(51) Int. Cl.
*F24F 11/00* (2018.01)
*F24F 11/77* (2018.01)
*F24F 11/56* (2018.01)

(52) U.S. Cl.
CPC .......... *F24F 11/0001* (2013.01); *F24F 11/77* (2018.01); *F24F 11/56* (2018.01)

(58) Field of Classification Search
CPC .... F24F 11/0001; F24F 11/0079; F24F 7/007; F02D 29/02
USPC .................................................. 454/343, 63
See application file for complete search history.

(56) References Cited

U.S. PATENT DOCUMENTS

| 4,189,094 A * | 2/1980 | Robinson .............. F24F 5/0071 236/46 R |
| 5,362,273 A * | 11/1994 | Pfeiffer, Jr. ........... B08B 15/002 454/63 |
| 5,542,250 A * | 8/1996 | Ball ...................... B08B 15/002 454/63 |
| 2004/0067049 A1* | 4/2004 | Woodward ......... B60H 1/00428 388/801 |
| 2005/0083212 A1* | 4/2005 | Chew ....................... G08G 1/14 340/932.2 |
| 2006/0234621 A1* | 10/2006 | Desrochers ............. F24F 3/044 454/239 |
| 2007/0089011 A1* | 4/2007 | Dodeja .............. G05B 23/0235 714/742 |
| 2010/0029195 A1* | 2/2010 | Jalali ..................... F24F 3/0442 454/341 |
| 2013/0117078 A1* | 5/2013 | Weik, III ............... G06Q 10/00 705/13 |
| 2015/0175179 A1* | 6/2015 | Green .................... B61L 19/06 246/27 |

* cited by examiner

*Primary Examiner* — Steven B Mcallister
*Assistant Examiner* — Allen R Schult
(74) *Attorney, Agent, or Firm* — Craig A. Phillips; Dickinson Wright PLLC

(57) ABSTRACT

A system and method for controlling facility exhaust systems and vehicle power interconnections. A controller for controlling exhaust ventilation systems in facilities related to vehicles, wherein the controller automatically engages and reengages operation of the exhaust ventilation system, based on vehicle status inputs and wherein the system is capable of determining location of a vehicle even when receiving an operational status signal, to avoid unnecessary operation when the vehicle is out of the facility and there is no need for ventilation of exhaust gases for the vehicle.

20 Claims, 12 Drawing Sheets

VEHICLE EXHAUST REMOVAL SYSTEM FOR BUILDINGS AND METHOD OF CONTROL

CROSS-REFERENCE TO PRIOR APPLICATION

This U.S. Utility Patent Application claims the benefit of U.S. Provisional Patent Application Ser. No. 61/934,710 filed Feb. 1, 2014, entitled "Vehicle Exhaust Removal System For Buildings And Method Of Control," the entire disclosure of the application being considered part of the disclosure of this application and hereby incorporated by reference.

BACKGROUND

First responders, the military and commercial operations often store and use vehicles inside a static location or facility. For example, fire stations typically store vehicles in a garage or apparatus room of a fire station, and many times those vehicles are running while inside the facility. Other examples of where vehicles are stored or operated inside a static location or facility include maintenance garages, airport hangers, police stations, loading facilities, shipping facilities, military facilities or any other setting where it is desirable at times to have a vehicle powered by an internal combustion engine or the like and running in an enclosed area, even for short time periods. The static location where the vehicles are stored may be augmented with various systems and devices ensuring an optimal, efficient, and safe, storage and maintenance of the vehicles in such an enclosed area.

Operation of vehicles generally results in the generation of exhaust gases and particulate matter such as soot, much of which may not be visible to the human eye. The majority of first responder and commercial vehicles used in these facilities are diesel vehicles, which are known to produce particulate matter harmful to humans when reaching an excess of certain specified levels. If these vehicles are operated inside an enclosed facility, the exhaust gases and particulates in the air may quickly spike. Exhaust gases from many internal combustion engines may also contain carbon monoxide and hydrogen sulfide which are harmful to humans even in low concentrations, as well as carbon dioxide in large quantities, which may displace the available oxygen in an enclosed area, reducing available oxygen for breathing which may lead to asphyxiation or death. To reduce potential health and safety issues of operating vehicles in enclosed spaces for even short time periods, many static locations may be equipped with an exhaust ventilation system for removing exhaust fumes from running vehicles. Exhaust ventilation systems are configured to capture the exhaust gases from the vehicles and transport the gases and particulate matter outside the building, in some cases filtering the air to remove particulate matter before exhausting the captured gases outside the facility. The facility exhaust ventilation system may have a variety of configurations but almost all systems include an exhaust fan at the facility operationally coupled to a vehicle exhaust system through various ducts and hoses. More specifically, various ventilation system manufacturers offer competitive solutions for implementing such facility exhaust ventilation systems, which typically include at least one flexible exhaust capture hose, which attaches to or is positioned proximate to a vehicle exhaust system and is operationally coupled to a blower; a network of rigid or flexible ductwork extending between the at least one flexible exhaust capture hose and the blower; a control system which activates the blower and also typically provides overcurrent protection to the motor of the blower; and a remote control system that uses a vehicle-initiated signal to activate the system based on simple proximity of the vehicle to the building. In operation, the hoses attach or are coupled to the vehicle exhaust system to evacuate exhaust fumes and soot before they can enter the air of the facility to prevent toxic fumes, gas, or particulate matter buildup in the air. The vehicle exhaust is then pulled through the network of rigid or flexible ductwork by the blower and discharged outside of the facility. Therefore, the facility exhaust ventilation system reduces occupational exposure to exhaust fumes of first responders and other workers in such facilities, particularly where long exposures may occur, such as the first responders living at the facility or workers or employees that are continually exposed to vehicle exhaust fumes in enclosed spaces. Toxic fumes, gases and airborne particulate matter present in vehicle exhausts all have been implicated as occupational health risks. Many first responder, airport, military, and commercial vehicles are situated in a static location which is enclosed and the vehicle must be kept running for extended periods of time due to various operational conditions. While the vehicles are running within an enclosed space, the facility exhaust ventilation systems allow humans to avoid exposure to vehicle exhaust particulates which have known health risks.

These facility exhaust ventilation systems are typically configured to be operational in response to a stationary vehicle being situated within and running in the static location. Once the vehicle leaves the static location, the exhaust ventilation system ideally turns off automatically. In this way, the energy use of the facility exhaust ventilation system is minimized. In addition, many garages, facilities, and enclosed spaces are climate controlled and leaving the exhaust ventilation system on for extended time periods, while not coupled to a vehicle, quickly removes the conditioned air in the facility, increasing operational costs of the facility.

One technique for ensuring that the facility exhaust ventilation systems are turned off when no longer necessary is the installation of a proximity transmitter device in each vehicle. The vehicle proximity transmitter device communicates wirelessly with a reception unit or receiver attached to a controller associated with the exhaust ventilation system. In response to the vehicle or set of vehicles being outside a predetermined range (or a range based on the capabilities of the wireless transmission), the controller may instigate a command to shut down operation of the facility exhaust ventilation system. For example, in response to the vehicle being situated at a specific distance away from the static location that includes the exhaust ventilation system, the evacuation functionality may be disabled. In order to accomplish this, a communication unit (or receiver unit) associated with the facility exhaust ventilation system may be equipped with a polling function that listens to the first responder vehicle transmitters and based on a non-response, a signal may be generated to instigate a disabling of the evacuation function. The transmitter in the vehicle may also communicate, such as through lack of signal that the vehicle has been shut down and there is no longer any need for the facility exhaust ventilation system to be operational. One problem with this automatic control is if a human operator disables the vehicle proximity transmitter, which could cause the facility exhaust ventilation system to not function when the vehicle enters the enclosed space.

Often times, a vehicle may still be within the wireless range of the facility exhaust ventilation system's communication unit, but not physically be within the confines of the static location, such as a building. For example, many fire departments conduct training in the parking lot of the facility that stores the vehicles, well within range of the communicator or receiver of the system in the facility. While some first responders have installed a physical switch that cuts power to the proximity transmitter in the vehicle, these systems may void the warranty of the facility exhaust ventilation system. Problems occur when a vehicle is hooked up or operationally coupled to the facility exhaust ventilation system and running but the evacuation function of the exhaust ventilation system is not active due to the proximity transmitter in the vehicle not being active. For example, not only may the hoses that attach the facility exhaust ventilation system to the tailpipe of the vehicle be damaged by the heat of the vehicle exhaust, carbon monoxide, toxic fumes and particulate matter may accumulate unnoticed to any humans in the facility. Any vehicle running in an enclosed facility and not hooked up to an operating facility exhaust ventilation system creates a dangerous situation, particularly if the people assume the system is active when it is not active. Therefore, prevailing wisdom in the industry is that the vehicle proximity transmitters in the vehicles should never be disabled, without a reliable mechanism to automatically re-enable the transmitter. Thus, the facility exhaust ventilation system in the facility may still perform an evacuation function while the vehicle is outside the facility and is running, and the facility exhaust ventilation system will not be disabled, and will continue operation even though it is not needed, thus, wasting energy associated with the operation of the facility exhaust ventilation system, adding unnecessary use of the exhaust ventilation system, when such system is not needed, and requiring conditioning of fresh air equivalent to that removed by the facility exhaust ventilation system.

In addition, when a vehicle equipped with a transmitter drives past a static location, it may cause the exhaust ventilation system or similar device to turn on in the facility, even though the vehicle has no desire to enter the static location or facility, and may not even be based at that location. While most current exhaust ventilation systems that have the ability to automatically turn off and on typically use a simple RF transmitter mounted in the vehicle communicating with a stationary receiver mounted in the building as the means of signaling the control panel to activate the exhaust system blower motor, to reduce false starts or nuisance activations some systems use coded transmitter. More specifically, while relatively low-cost and simple, the RF transmitters and receivers have a large and variable activation range, and can activate due to vehicles tens to hundreds of feet from the building, resulting in nuisance activations of the exhaust system. To reduce the nuisance activations, a transmitter encoding scheme is used to associate specific transmitters with specific receivers. For example, a fire department with two fire station buildings, each with an exhaust ventilation system, might elect to program the vehicle transmitters for each building with different codes. Thus, a vehicle normally housed in or associated with a first station traveling past a second station within range of the RF receiver would not activate the facility exhaust system of the second station. Unfortunately, this creates a new and more problematic nuisance. If a vehicle normally housed in or associated with a first facility is temporarily relocated to a second facility, the facility exhaust system will not activate when needed. If the change is permanent, the vehicle transmitter modules could be manually swapped between vehicles or the facility receiver systems could be reprogrammed to recognize different codes. However, for companies or organizations with a large number of buildings and vehicles, such manual swapping or reprogramming would be unacceptably tedious, time-consuming, and still could cause serious issues if the operators of the vehicle expect the facility exhaust ventilation system to automatically function and it does not operate. If the system does not use a coded transmitter, the simple visiting of a vehicle from another facility may activate the facility exhaust ventilation system when not needed. An additional weakness of the present RF transmitter/receiver solution for automating the off and on cycling of exhaust ventilation systems is that the transmitters typically have a wireless coverage range of thousands of square feet, making it not uncommon for a vehicle containing a transmitter to activate a building exhaust system receiver from over 500 feet away, thus providing an additional source of nuisance exhaust system activations.

Many existing systems on the market suffer from several significant performance and energy efficiency drawbacks, in addition to the drawbacks mentioned above. For example, existing control panel designs control the blower motor with a simple electromechanical contactor that connects the motor to the electrical supply under direction of a control panel circuit based on operator or remote vehicle signals. The electromechanical contactor also may provide simple overload protection for the motor by sensing an abnormally high electrical current draw by the motor, such as when the contactor senses a current draw which is higher than normal motor operating current but below a short circuit current.

The blower is typically powered by an electric motor, either directly or through a belt drive or the like. Because of the power demand of motors capable of moving sufficient volume of air, generally three phase motors are used. One issue is that the motor electromechanical contactor generally does not provide phase loss protection for three-phase motors, and existing facility exhaust ventilation systems typically do not provide any phase loss protection. Phase loss conditions can occur when one or more current-carrying conductors supplying the motor exhaust system are disrupted due to internal building wiring failures, external deficiencies with the utility supply to the building, or a variety of other issues. A three-phase motor will typically rapidly overheat and fail if subjected to deficient three-phase electrical supply such as the loss of one or more phases, or a severe voltage imbalance across the three phases, such as an imbalance exceeding 10 percent. Therefore, present systems do not adequately address issues with deficiencies in three-phase power.

In existing systems, a mechanical or electromechanical contactor is merely configured to close or open the circuit to the blower motor, similar to a switch. When activated by the controller, the contactor supplies full line voltage to the motor, which starts and attains a fixed maximum speed. With the motor at a fixed maximum speed, the blower moves a fixed volume of air per minute regardless of the number of vehicles using the system to evacuate exhaust gases and particulate matter. Conditioned air inside the building is also being ventilated by the system, potentially resulting in increased energy costs to heat or cool make-up air entering the building through leakage and international make-up air inlets to offset the air being drawn out through the exhaust ventilation system.

SUMMARY OF THE INVENTION

The present invention is directed to an intelligent facility exhaust ventilation system that is configured to operate with a vehicle equipped with a transmitter capable of providing operational status of the vehicle.

The present invention is directed to a facility exhaust ventilation system installed in a facility for housing vehicles and configured to safely exhaust vehicle exhaust gases exiting the exhaust tailpipe of any vehicles running in the facility. The facility exhaust ventilation system generally includes a blower system operationally coupled to at least one hose configured to attach to the exhaust tailpipe of the vehicle; a receiver including an antenna configured to receive a wireless signal from at least one vehicle housed in the facility; and a control system receiving a signal from said receiver regarding an operational vehicle within the facility. Of course multiple antennas and receivers may be used to avoid potential dead spots. The blower system may also include ductwork extending between the blower and the hoses, with gates configured to open and close to control airflow through the hoses.

The system may include including an ID scanner, capable of determining the identity of the vehicles in the facility. The ID scanner may be one of a camera, laser scanner, optical scanner, or RFID scanner or other device capable of determining the identity of the vehicle, and further may be configured to sense a vehicle in a specified parking space. For example, the ID scanner may be a camera system similar to a traffic light camera system that determines the presence of a vehicle in a specified spot, which in this instance is the parking spot. The ID scanner may read a number from the vehicle, a bar code or similar id tag, or may even recognize the vehicle solely based on the shape of the vehicle as compared to a stored shape. As such, the ID system may sense when a particular vehicle is in a specified parking space and activate the exhaust ventilation system for the parking spot in response to an operational status input from the vehicle.

The facility exhaust ventilation system may include a control system having an event and vehicle storage memory, and an analog and digital real world interface. The vehicle and event storage memory logs events, may store thresholds and ranges, as well as identities of associated vehicles. The analog and digital real world interface is in communication with a variety of sensors, including pressure sensors and air quality sensors, such as gas sensors, and particle count sensors. The pressure sensor is configured to sense pressure in ductwork between said blower and said hoses. Multiple pressure sensors may be used, such as one per vehicle to determine the proper pressure range for each hose to ensure sufficient air removal for each vehicle that is running. The particle count sensors measure harmful particulates in the air from a variety of sources, including exhaust gases and the system can use to increase the amount of air removal provide warning or take other steps upon the particle counts exceeding set thresholds. The analog and digital input may also receive feedback regarding at least one of current and voltage from a motor of said blower system, particularly the motor to ensure proper operation of the system.

The control system further may further include a network interface and intelligent control logic. The network interface allows communication to various outputs, such as computer aided dispatch systems, and human operators. The facility exhaust ventilation system may further include a display and a human interface. The facility exhaust system includes a blower system having a motor and a fan unit driven by said motor and wherein said motor is controlled by a variable speed motor drive. Of course multiple motors and fan units may be used. The blower system may include a motor and a fan unit driven by said motor and wherein said motor is controlled by at least two variable speed motor drives and the control system uses a selector relay to control which variable speed motor drive is used at any given time to control said motor. Of course, the motor may be controlled one of a variable speed motor drive and a motor starting contactor where the control system uses a selector relay to control which of said variable speed motor drive and motor starting contactor is used at any given time to control said motor.

The system may include induction loops to sense the presence or passage of vehicles. For example, each parking spot in the facility may include an induction loop used to sense the presence or absence of a vehicle in that parking space. In addition, an induction loop may be located proximate to each garage door so that as a vehicle passes by such induction loop as it enters or leaves through the garage door, its entrance or exit may be sensed. As the induction loop only senses the presence or absence of a vehicle, other sensors or information in the vehicle event and storage memory may be used to determine if the vehicle is entering or exiting the facility. In addition, the induction loops may be located proximate to the driveway entrances and exits between the facility parking lot and the street such that a vehicle entering or leaving the parking lot must pass by said induction loop. Again, other input and in formation in the control system may be used to determine of the vehicle is entering or exiting the facility premises.

The present invention is also directed to a method of controlling a facility exhaust ventilation system located inside a facility and configured to be attached to the exhaust tailpipe of a vehicle to remove exhaust gases of the vehicle while running in the facility. The method generally includes the steps of determining the operational status of a vehicle as either running or not running; determining that the vehicle is located inside the facility in response to determining the operation status of a vehicle as running; and engaging the blower system in response to determining that the vehicle is located inside the facility.

The method step of determining the operational status of the vehicle may include the step of receiving a wireless signal from the vehicle confirming that the vehicle is running. In addition, the method may further including the steps of determining that the vehicle is running during said step of determining the operational status of a vehicle; determining that the vehicle is inside the facility and not within wireless range of the facility but outside of the facility. In addition, the step of determining that the vehicle is located inside the facility may include the steps of determining vehicle identity; determining location of the vehicle inside the facility; and creating a suction for the hose associated with the determined location of the vehicle.

In addition, the steps may include as part of determining vehicle identity, reading the vehicle identify with an ID scanner, such as one of an optical scanner, a laser scanner and RFID scanner.

The step of creating suction may further include the step of opening a gate associated with the hose, ensuring the blower is operational by at least one of verifying a pressure reading within an acceptable operational parameter in the hose, or the motor voltage and current are within operational ranges.

The method may include reading the air quality in a facility, such as reading a particle count or gas levels in the facility. For example, the method may include the step of providing an alarm when the particle count or gas levels exceeds a set threshold and the system may take steps to reduce the particle count or gas levels in the facility, such as opening gates, including gates associated with vehicles in a not running status and operating the blower at or near maximum output.

The method may include the step of providing feedback of the operational status of the vehicle to a network interface, such as to at least one of a computer aided dispatch system, a tablet, a computer, or a smartphone.

DESCRIPTION OF THE DRAWINGS

The detailed description refers to the following drawings, in which like numerals refer to like items, and in which.

DETAILED DESCRIPTION

Disclosed herein are systems and methods to integrally control a transmitter-based function associated with a static location with vehicular operation. By integrating the control of the transmitter with the operation of the vehicle, the enabling and disabling of a transmitter becomes seamless, and prevents dangerous situations. In addition, the system and method of operating exhaust ventilation systems in a facility is also disclosed and discussed.

In response to a vehicle being within wireless range of a communication unit associated with a static location, while not being in the static location, a human operator of the vehicle may manually disable a transmitter associated with the vehicle. However, because the process to disable the transmitter is manual, often times not intuitive, it may create a dangerous situation if the operator does not reactivate the transmitter before returning the vehicle to the static location. More specifically, because the transmitter is disabled, various services, such as the facility exhaust ventilation system for evacuating exhaust fumes and particulate matter may not be engaged if the vehicle is left running in the enclosed static location.

Disclosed herein are the methods and systems to integrally control a transmitter-based function associated with a static location, such as a building or facility, via vehicle inputs related to an operation associated with a vehicle. Because the vehicle inputs related to operation of the vehicle are integrated with a common-place vehicular operation, the disabling and enabling of a function, particularly re-enabling is seamlessly performed when the proximate first responder vehicle is returned to an enclosed static location.

In this way, if the function being performed is the removal of exhaust fumes and particulate matter from a static location, a safe and healthy environment may be promoted, with the present invention. Further, the present invention reduces wear to various components of the facility exhaust ventilation system and unnecessary energy consumption as well as reduces the undesirable evacuation of conditioned air from some facilities and thereby reduces energy costs associated with conditioning replacement or make-up air.

The vehicle system 100 that is used in association with the facility exhaust ventilation system 10 will be first described in detail.

Figure 1:
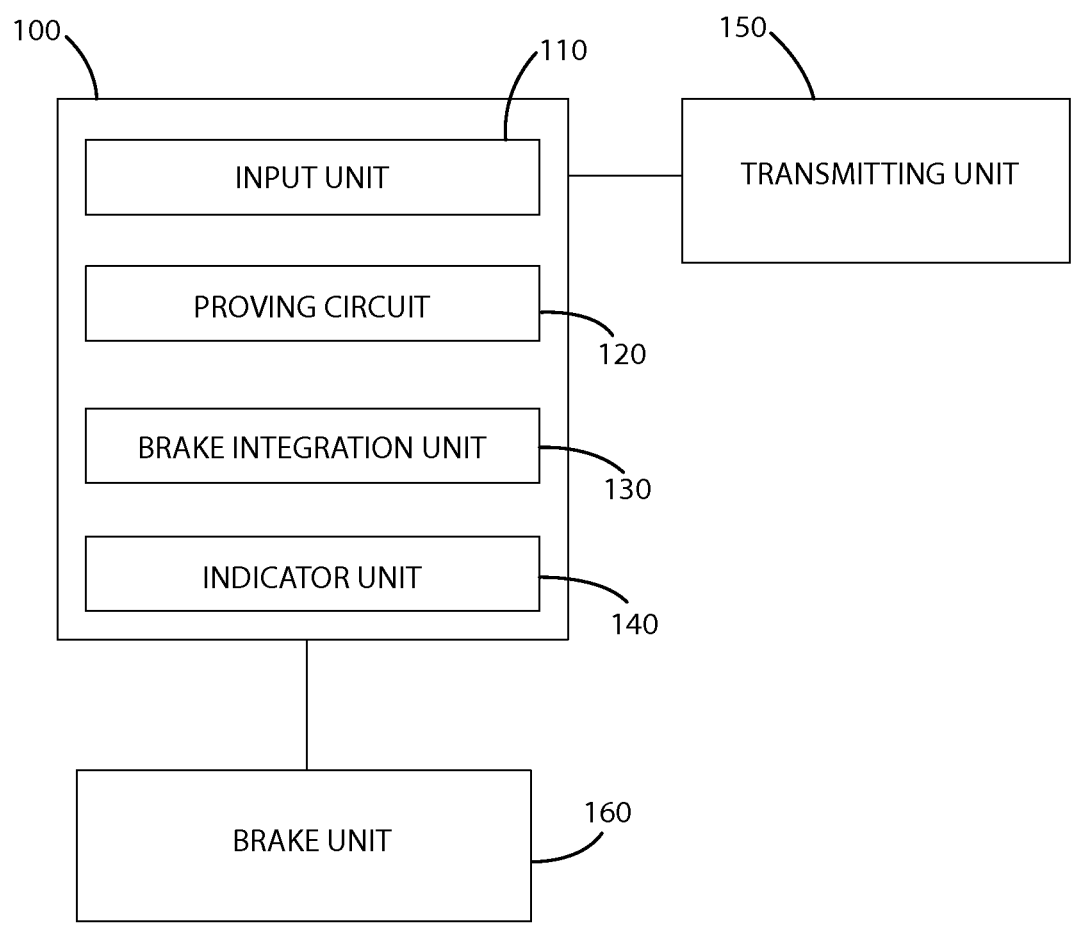
FIG. 1 is a block diagram illustrating an example system for integrally controlling a transmitter via a vehicular operation.

FIG. 1 is a block diagram illustrating an exemplary system 100 located in a vehicle for integrally controlling a transmitter via a vehicular operation. The vehicle system 100 may be employed on an electronic device as described herein. The vehicle system 100 includes an input unit 110, a proving circuit 120, a brake integration unit 130, and an indicating unit 140, such as a light-emitting diode (LED) unit or enunciator. A processor (not shown), may be included with vehicle system 100 to aid and augment the implementation of the various elements associated with the vehicle system 100.

The vehicle system 100 connects to a transmitting unit 150, and to a brake unit 160. The transmitting unit 150 and the brake unit 160 may be situated in the vehicle. The brake unit 160 may provide the vehicle inputs used by the vehicle system 100.

The input unit 110 receives an input from a human operator of the vehicle system 100. The input unit 110 may be implemented with a rocker switch, or the like, such as switch 310 in FIG. 3. Thus, the input unit 110 receives an input by a human operator to indicate that the vehicle system 100 may instigate a signal to disable the transmitting unit 150 in the vehicle 50.

The proving circuit 120 of the vehicle system 100 indicates that power is active, such as a DC voltage is applied to the transmitting unit 150. By indicating that power is applied to the transmitting unit 150, an operator of the vehicle may be cognizant of the transmitting unit 150 being operational. Of course, power may be automatically applied when the vehicle 50 is running, unless specifically disabled by the operator of the vehicle 50.

Further, the proving circuit 120 may be implemented as a separate circuit from the other elements of vehicle system 100. By doing so, this ensures that the indication of the power applied state of the transmitting unit 150 is independent and not contingent or falsely reported based on an error associated with the other elements.

To reactivate the transmitter, the brake integration unit 130 receives an indication from the brake unit 160 that the brakes of a vehicle 50 have been activated. Thus, in response to a human operator of the vehicle 50 asserting a braking action, a signal is transmitted to the brake integration unit 130. The brake unit 160 may be hardwired from the brake system of the vehicle 50, such as receiving a voltage signal when the brake lights are illuminated, or input from a separate switch that is activated by movement of the brake pedal, or by a change in braking system pressure. Alternatively, the brake unit 160 may be connected to a controller area network (CAN) of a vehicle. In either case, the vehicle is capable of communicating to the vehicle system 100, via the brake unit 160, that a braking action has occurred from a human operator.

The processor determines whether an indication is made and provides an output to the indicating unit 140, of course the indicating unit 140 may include its own processor. As stated above, the indicating unit 140 may be an LED associated with the vehicle system 100 such as the color of the signal or LED to be displayed. In an example operation, a red LED is indicated if the brake integration unit 130 is detected. A rationale for selecting the red LED is that in first responder vehicle human/computer interactions, red is often used for important and critical functions. Additionally, blue may be employed to indicate that power is applied to the transmitting unit 150. Of course, other recognizable notification or indications may be used.

The operation of vehicle system 100, in performing the integral controlling of a transmitter via a vehicular operation is described in greater detail below with regards to FIGS. 2A and 2B.

Figure 2A:
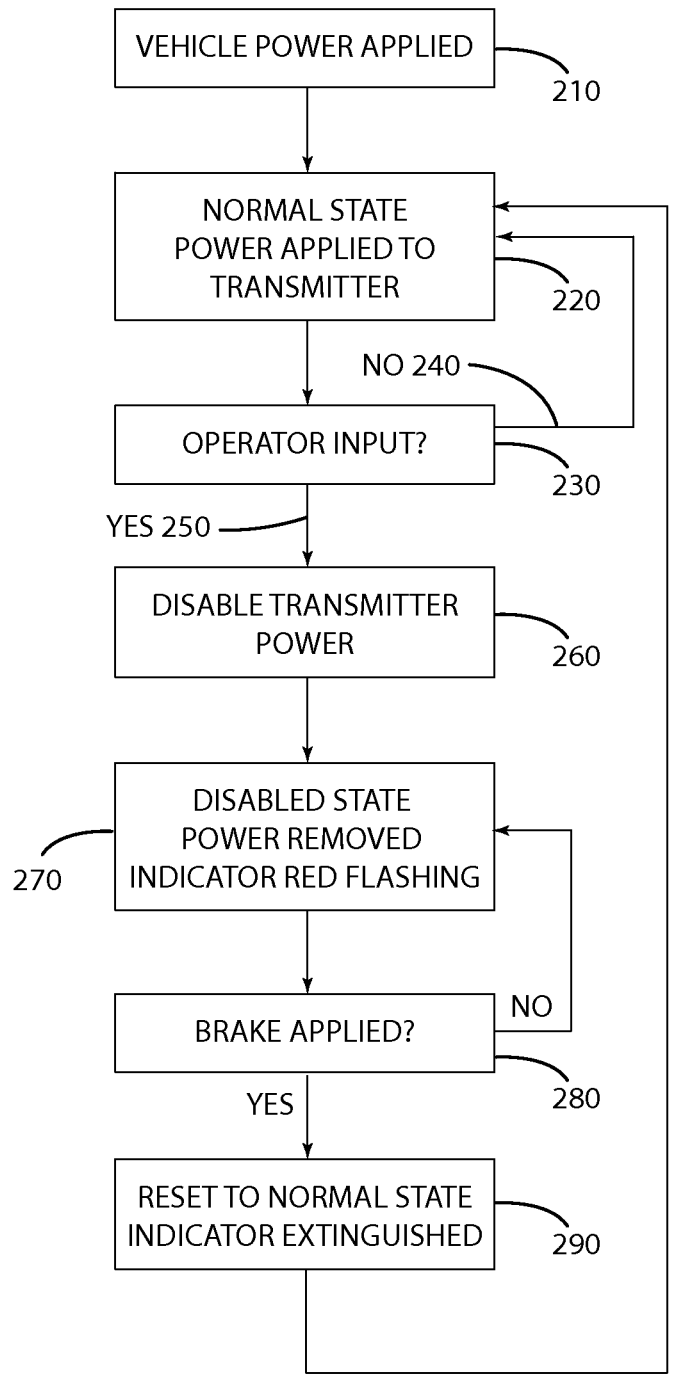
FIG. 2A is a state diagram illustrating an example method for integrally controlling a transmitter via a vehicular operation.
Figure 2B:
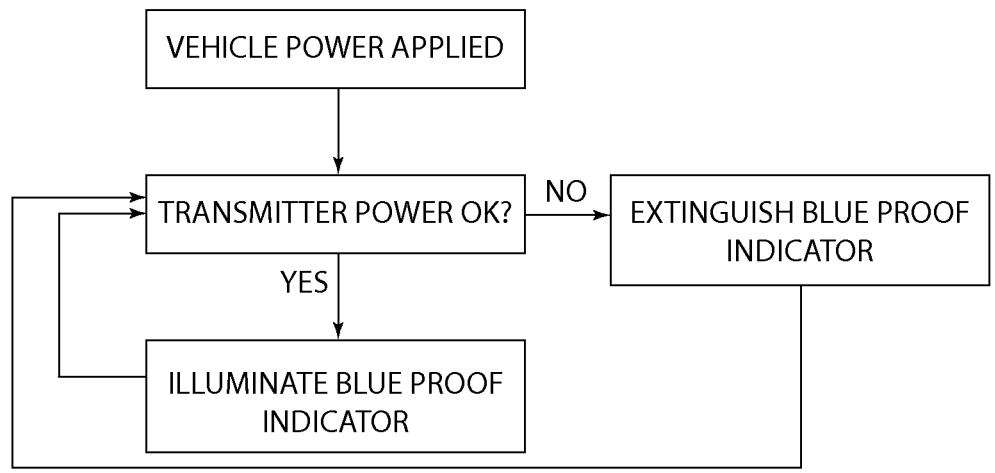
FIG. 2B is a state diagram of the proving circuit.

FIGS. 2A and 2B illustrate an example method and state machine 200 for integrally controlling a transmitter 150 via a vehicular operation. The method 200 may be implemented on the vehicle system 100 described above.

If a vehicle 50 is moved to a location outside of the facility 2, the operation of the vehicle system 100 will be as described below. Upon starting the vehicle, vehicle power is applied 210 to the vehicle system 100. The vehicle system 100 will be active and communicating with the facility exhaust ventilation system 10. As the vehicle 50 exits the facility 2, the vehicle system 100 will be its normal state 220, and the facility exhaust ventilation system 10 will be active so long as the transmitter 150 is within range of a receiver 20 in the facility 2.

If the operator of the vehicle 50 desires to deactivate the facility exhaust ventilation system 10 while the vehicle 50 is running within proximity range of the facility 2, the vehicle 50 is first parked in a desired location. It is assumed that the vehicle 50 is parked such that the transmitter 150 is still within range of the receiver 20 in the facility 2. Once the vehicle 50 is properly parked, such as with the parking brake set or any other safety features outside of the facility 2, that vehicle's transmitter 150 in communication with the facility exhaust ventilation system 10 may be deactivated. As such, the facility exhaust ventilation system 10 will not be active while such vehicle 50 is operational outside of the facility 2, with the transmitter 150 deactivated.

The vehicle system 100 awaits an input for deactivation. The vehicle system 100 is in a waiting state 230 for an input. If the vehicle 50 drives away from the facility 2, and no input is provided 240, the system 100 remains in its normal state 220. Only when the vehicle 50 and the transmitter 150 are out of range of the receiver 20, will the facility exhaust ventilation system 10 turn off.

In normal operation 210, starting with power being applied, if a deactivation input 250 is provided by the human operator to the vehicle system 100 or detected by the system 100, the system 100 will take steps to deactivate the transmitter 150. More specifically, in operation 220, if a human operator deactivates the transmitter 250, the indicator unit 140 may flash a red LED on system 100 alerting a human operator to such deactivation thereby acknowledging the input 250 and deactivating 260 the transmitter 150 to enter a disabled state 270. The vehicle system 100 upon deactivating the transmitter 150 reports the changed state 270 of the transmitter 150 with the indicator unit 140, such as the mentioned flashing LED or some other method of notification. With the facility exhaust ventilation system 10 properly disabled, due to no transmission by the transmitter to the receiver, any activities, such as training may occur without the facility exhaust ventilation system running unnecessarily.

After the training is complete, the operator may desire to return the vehicle to the facility. Upon receiving a vehicle status change input, such as a brake status input 280, the vehicle system 100 may be reset 290 and enter the normal state 220. Of course, the vehicle system 100 may repeat the process as illustrated in FIG. 2A. More specifically, in operation an operator provides a vehicle status signal change, such as providing a braking system input through activation of the brakes, release of the parking brakes and the like. The brake integration unit 130 may receive a signal from the brake unit 160 that the operator has applied the brakes, even temporarily, of the vehicle 50.

In the disabled state 260, the power is typically cut to any connected transmitter 150. Upon resetting 290 a determination is made as to whether an input is asserted. If the input unit 110 detects that an input is asserted, the method 200 proceeds to see that power is supplied to a transmitting unit 150. In this case, with power supplied, the transmitting unit 150 initiates or maintains wireless communication with a receiver 20 at the static location 2, thereby maintaining the operation of the facility exhaust ventilation system 10 controlled by the receiver 20 receiving a signal or not receiving a signal from a transmitter 150.

As stated above, the proving circuit 120 provides a detection of whether the transmitting unit 150 is connected to a power supply. As explained above, because the proving circuit 120 is not associated with the circuitry used to implement an input unit 110 and the other elements of system 100, the integrity of the data being displayed is enhanced. Operation of the proving circuit is illustrated in FIG. 2B.

In operation, power to the transmitter 150 is automatically applied after a detection of activation of the brakes. Thus, a resuming of the operation of a device such as the facility exhaust ventilation system 10 associated with a receiver 20 in a static location occurs without any sort of manual human interaction (other than the normal operation of the first responder vehicle). More specifically, the vehicle system 100 where the transmitter 150 is deactivated, the transmitter 150 is reactivated through normal operation of the vehicle, allowing automatic reactivation without human interaction other than normal operation of the vehicle. As such, an operator moving a vehicle, solely through the act of moving the vehicle 50, will reactivate the transmitter, thus turning back on or reactivating the facility exhaust ventilation system 10.

Figure 3:
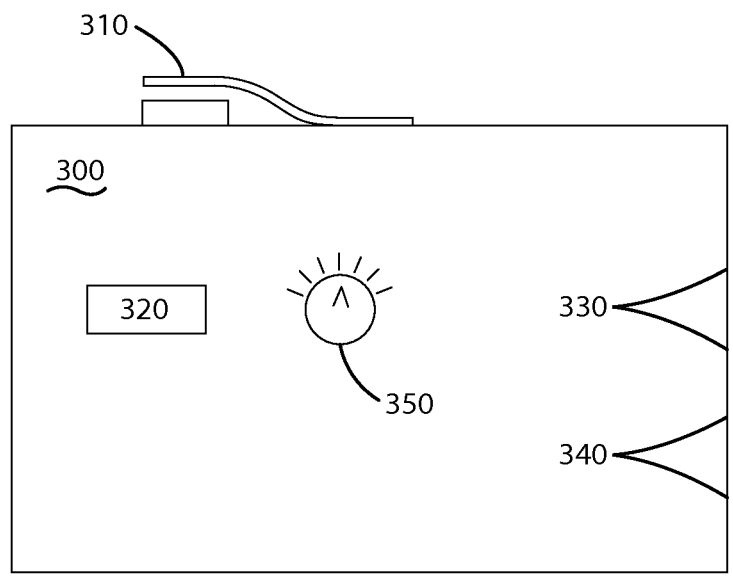
FIG. 3 illustrates an example of system described in FIG. 1 implemented in a device affixed to a first responder vehicle.

FIG. 3 illustrates an example of a vehicle system 100 implemented in device 300. Device 300 includes a rocker switch 310, indicator 320, such as one or more LEDs located within the rocker switch or next to it, a transmitter connection port 330, and a vehicle connection port 340. In the illustrated example, the LEDs may flash red when the transmitter is disabled and provide a blue output when active. The device 300 may include fastening mechanisms, such as screws to affix to the device 300 to the vehicle in a location compliant with the safety regulations associated with the vehicle. Of course, any method of fastening, securing or placing it safely in the vehicle may be used. Of course, the device 300 illustrated in FIGS. 3 and 4 is only exemplary.

Figure 4:
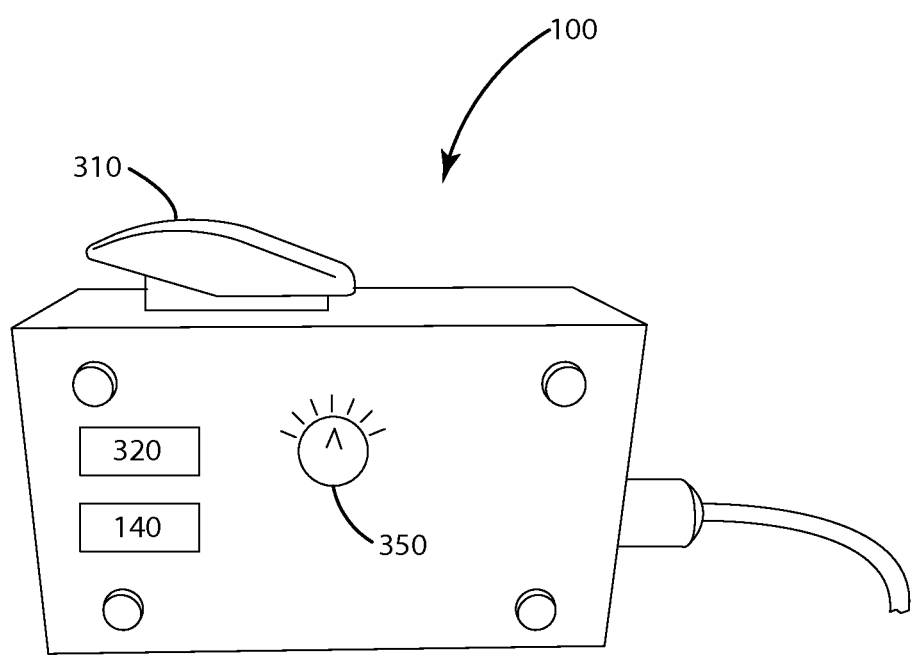
FIG. 4 illustrates an exemplary transmitter and control system.

As shown in FIGS. 3 and 4, the rocker switch 310 is provided on the outer casing of the device 300. The rocker switch 310 may be used to supply the input received by input unit 110.

The LED 320 may display an LED based on the operational state indicated by the indicator unit 140. For example, after a detection of an operator brake application is made, the indictor 320 may display a red LED (or a red flashing LED) to indicate that the vehicle system 100 is awaiting vehicle input status change, and the transmitter 150 is inactive. Additionally, the indicator 320 may display a blue LED to indicate the power state of transmitting unit 150.

The transmitter connection port 330 may connect to a transmitting unit 150, and provide the signal to deactivate the power applied to the transmitting unit 150. Alternatively, the proving circuit 120 may use the transmitter connection port 330 to determine the power state of the transmitter unit 150.

The vehicle connection port 340 may communicate and receive an indication or signal that the brake system of a vehicle has been activated. Thus, the vehicle connection port 340 may communicate this signal to the brake integration unit 130.

According to the aspects disclosed herein, a seamless control of a transmitting unit 150 is provided. By implementing the systems and methods disclosed herein, wear on devices such as facility exhaust ventilation systems 10 at a static location 2 for vehicles 50 is prevented. Further, unnecessary energy losses are prevented. Finally, because human intervention is obviated, errors associated with the operation the devices at a static location for housing vehicles are prevented. In this way, the health of workers, first responders and the like is maximized, while the integrity of the devices and machinery employed to ensure this health is maintained.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory of volatile or non-volatile type. The computer storage medium can also be, or can be included in, one or more separate tangible components or media such as multiple CDs, disks, or other storage devices.

An exemplary vehicle system 100 is illustrated in FIG. 4 that as a BSLND-AA Vehicle Transmitter Controller, illustrated in FIG. 4 allows DC power to a truck transmitter module 150 to be interrupted manually by the vehicle operator. Power to the transmitter module 150 is then automatically restored when the vehicle brakes are applied.

The BSLND-AA Vehicle Transmitter Controller is a specific vehicle system 100, designed to allow a vehicle fitted with a transmitter 150 to be operated within the radio-frequency reception range of the facility exhaust ventilation system receiver 20, but without causing the system 10 to remain energized continuously. Such circumstances might include on-premise outdoor apparatus training exercises, apparatus pump testing, and short-term parking of idling apparatus outside a fire station, as might occur during staging or response conditions. To activate the disable feature, the vehicle operator parks the vehicle 50 in the desired location, sets the parking brake, and observes appropriate wheel chocking and other safety procedures for securing a running vehicle. Then the operator depresses the controller's or devices 300 rocker switch 310, activating the controller circuitry and disconnecting DC power from the transmitter module 150. The rocker switch 310 contains a large red indicator LED which blinks approximately once per second to indicate the transmitter module has been disconnected. The controller or system 100 will maintain this condition indefinitely until the vehicle brakes are applied, or the vehicle is turned off. The controller or system 100 is designed with a fail-safe philosophy, and by default powers up with the transmitter module DC supply active. The rocker switch 310 contains a blue LED connected to a proving circuit that demonstrates that DC power is present at the transmitter connector. The proving circuit is independent of the control circuitry, allowing immediate visual confirmation of transmitter functionality.

The controller can be affixed directly to the vehicle interior with customer-supplied screws.

The controller 100 controls the transmitter 150 module and allows a vehicle operator to disable the transmitter module 150 manually and further automatically re-enables transmitter 150 when vehicle brakes are applied. The transmitter 150 plugs directly into the controller 100 with no modification. The controller 100 may include 12 volt DC, negative ground; optional with a 24V DC negative ground version available. It requires only three connections to a vehicle electrical system (switched battery B, ground, and brake signal). It can be installed on virtually any vehicle such as any fire apparatus as well as light trucks and automobiles. The power supply for the controller may be the vehicle battery input 12V DC nominal, with a supported range 11.0V through 16.0V (12V units only). The controller 100 is furnished with approximately 25 feet of three-conductor cable for connection to vehicle electrical system. In the example, the red wire connects to switched battery (ignition on or automobile run circuit), the black wire connects to ground and the white wire connects to the vehicle brake signal, which can be derived from the vehicle's power distribution system, from the air brake switch, or from the vehicle brake light circuit. Of course, the colors of the wires may freely vary. A fuse may be used on the battery supply to protect the controller, such as a maximum 2 ampere fuse.

Figure 7:
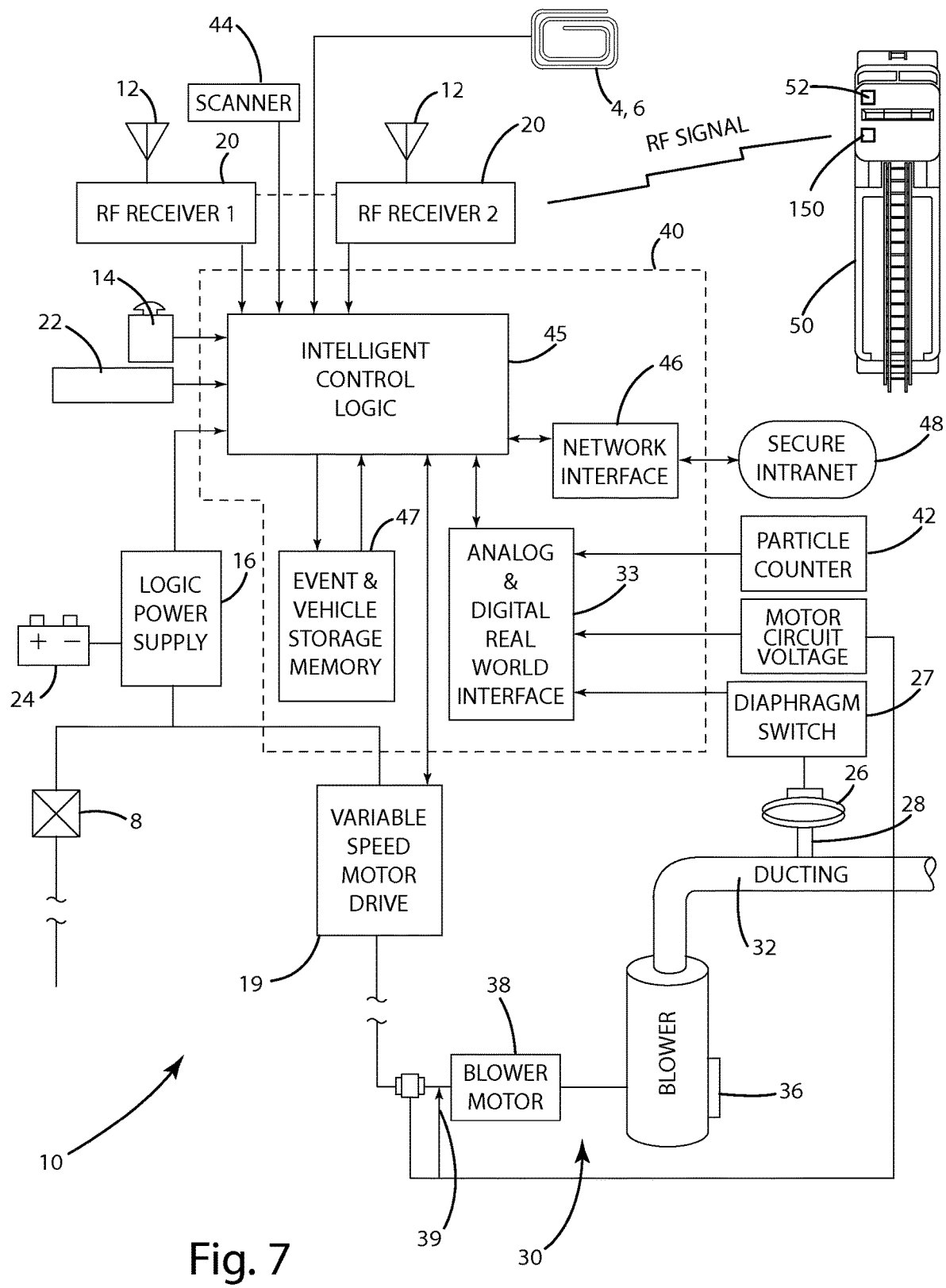
FIG. 7 illustrates a schematic diagram of the facility exhaust ventilation system.

The facility exhaust ventilation system 10 may have a variety of configurations but generally includes include an exhaust fan or blower 30 at the facility 2 operationally coupled to a vehicle exhaust system through various ducts 32 and hoses 34. More specifically, the facility exhaust ventilation system 10 typically includes at least one flexible exhaust capture hose 34, which attaches to or is positioned proximate to a vehicle exhaust system and is operationally coupled to the blower 30 through a network of rigid or flexible ductwork 32 extending between the at least one flexible exhaust capture hose 34 and the blower 30. The pipes or ductwork 32 may be any pipes or ductwork capable of providing the required removal or transportation of exhaust gases that meet the desired operational specification, specifically that almost all exhaust gases are removed from a vehicle and do not enter the enclosed facility space once hooked up to the system 10. The facility exhaust ventilation system 10 also includes a control system 40 which activates the blower 30 and may also provide overcurrent protection to the motor 38 of the blower 30, as illustrated in FIG. 7. The blower 30 also may include a fan unit 36 coupled to the motor 38 to move the air. The blower 30 may exhaust the air out of the building. The control system 40 includes a receiver 20, which in turn may include an antenna 12 that is in communication with the transmitter module 150 in the vehicle 50 when the system 10 is operational, and not in communication when the system 10 is disabled, at least for that particular vehicle. It should be understood that when the system 10 is referred to as being disabled in a facility configured to house multiple vehicles, the system 10 may be disabled for the portion that extends to where that specific vehicle 50 is normally parked within the facility, such as by closing a gate 31 that stops air from being drawn through the flexible house 34 associated with the particular vehicle. Of course as more gates 31 are closed in a multiple vehicle facility, the control system 40 may adjust its speed of the blower 30 or amount of air being evacuated by the blower 30 to improve operational performance and save energy.

Figure 5:
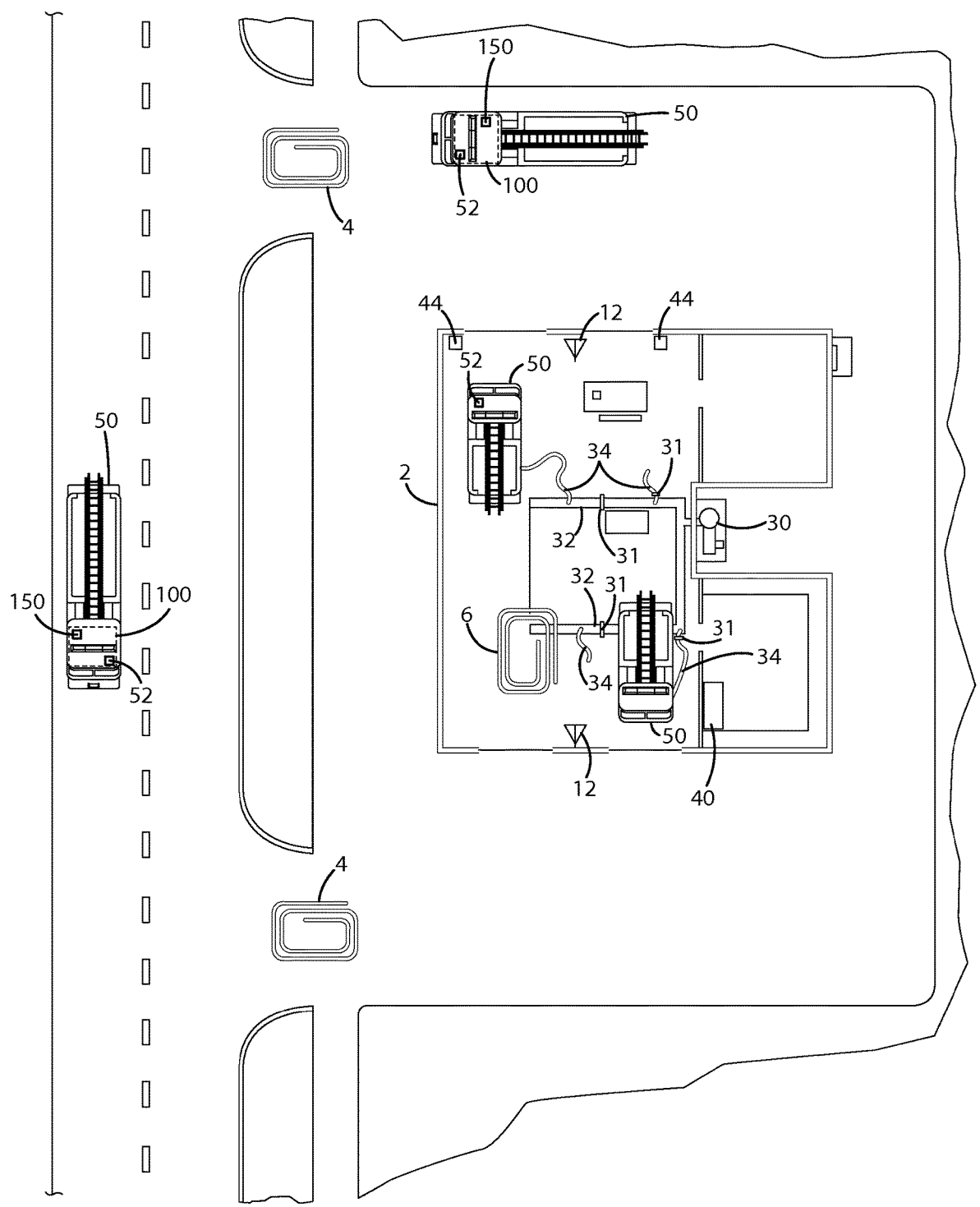
FIG. 5 illustrates an exemplary facility having a facility exhaust ventilation system.
Figure 6:
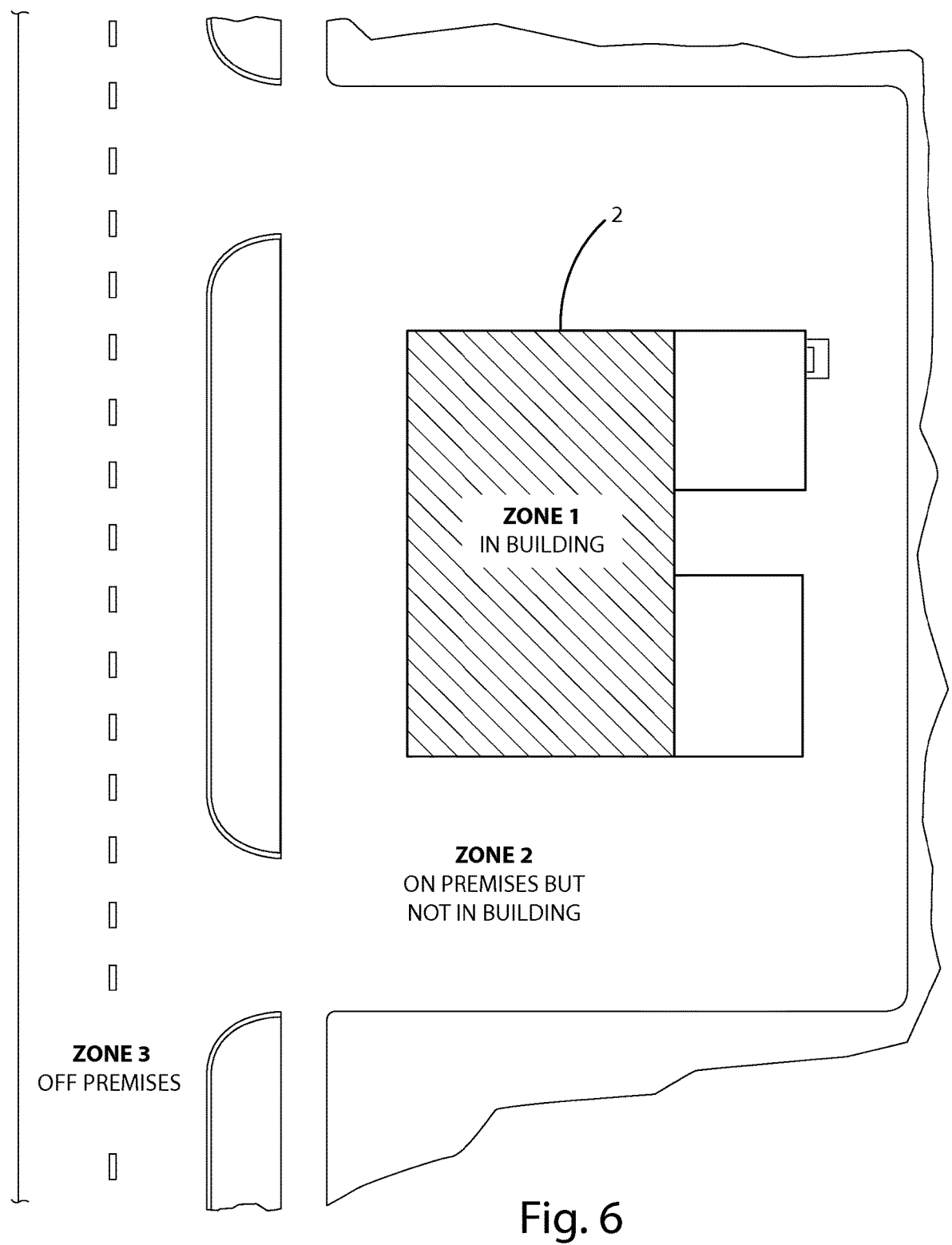
FIG. 6 illustrates the exemplary facility in FIG. 5 including zones.

As further illustrated in FIGS. 5 and 6, a diagram of an exemplary fire station is provided. The facility 2 is the fire station, which is capable of housing four vehicles 50. Each vehicle 50 is illustrated as including the vehicle system 100, which includes a transmitter 150 capable of communicating with the receiver 20, specifically the antenna 12, and a vehicle identification tag 52, such as an RF ID tag, upc code or other mechanism to identify the particular vehicle 50 to the facility exhaust ventilation system 10. As with most fire stations, the illustrated facility 2 includes at least a garage area for housing the vehicles, living quarters, and a mechanical room. The mechanical room is illustrated as including the control system 40 for the facility exhaust ventilation system 10, and the blower 30 is illustrated as being located outside, although it could as easily be located inside of the mechanical room, or located elsewhere in the facility 2. Extending from the blower are rigid ductwork pipes 32 and flexible tubes 34 extending down to connect to a vehicle's exhaust system. A gate 31 is illustrated as allowing the control system 40 to individually control air flow through selected flexible hoses, such as when one vehicle is not present, or when the control system determines a vehicle is not running. Of course, if the vehicle is in zone 2, it may also close a gate 31, or as described above, the operator may override the vehicle system 100, from which the control system 40 closes a gate 31.

The facility 2 in FIGS. 5 and 6 is illustrated as having a parking area and driveways exiting to a main road area. The driveways are illustrated as including an inductive loop or other sensing mechanism 4 to determine when a vehicle 50 leaves the premises of the facility, yet may still be in range of the wireless transmitter 150 and receiver 20. The inductive loop or other sensing mechanism is optional, but provides additional functionality and certainty in determining when a vehicle passes between zones 2 and 3. As further illustrated in FIG. 5, each parking spot in the facility 2 may include an inductive loop 6 or facility proximity sensor. The facility inductive loop 6 allows an optional additional verification of the presence or absence of a vehicle in the proper spot and with greater certainty than the communication link between the transmitter 150 and receiver 20. The method of using such inductive loops 4, 6 is described in greater detail below. The facility loops 6 may also be placed proximate to each garage door in the facility through which a vehicle may enter or exit the facility and read the entry or exit of a particular vehicle. In addition it should be recognized the inductive loops 4, 6 may be replaced with an optical system configured to recognize the subject vehicles, including identify and determine their leaving or entering of the facility and well as the parking lot to the facility.

As specifically illustrated in FIG. 6, the location of a vehicle may be divided into multiple zones. For example, a first zone may be anything inside the facility, and the second zone anything outside of the facility. As illustrated in FIG. 6, the example includes three zones, as further discussed below.

A detailed schematic diagram of the system 10 is illustrated in FIG. 7. A control system, control panel or control logic 40 is in communication with an events and vehicle storage memory 47, a network interface 46 that allows communication with the internet or a secure intranet 48, an analog and digital interface 33, a variable speed motor drive 19, a logic power supply 16, an interactive user display screen 22, the human interface, such as the illustrated control switch 14, the first and second receivers 20 and the optional inductive loops 4, and 6. As illustrated a signal passes from the transmitter 150 on the vehicle to an antenna 12 on a receiver 20. The illustrated system 10 has two receivers 20 and two antennas 12 for redundancy, and assured wireless coverage. The receivers 20, and their associated antennas 12, may be located at opposite ends of the facility 2, as illustrated in FIG. 5. The inductive loops 4 and 6 are described above and below. The system 10 is configured to read an electronic identification tag 52, such as RFID tag, bar code or other unique coded tag on a vehicle 50, with an ID scanner 44, such as an RFID or optical scanner. To ensure accurate coverage of inside the facility 2 and on the premises around the facility 2, multiple ID scanners 44 may be used.

A human interface, such as the illustrated manual push button 14 may control activation or deactivation of the system 10. Of course keypads, switches, touch screens and other software interfaces may form the human interface. The control system 40 includes a power supply 16 supplying power to the system 10, and a motor starting contactor with overload protection 18 providing power to the blower motor 38. A building power supply 8 provides power to the complete system 10, and may include a switch to cut power to the whole system.

The interactive display screen 22 is configured to allow an operator to view operational parameters and if necessary adjust them. The interactive display screen 22 may also indicate elapsed operating time, counts of system activations, current or past system failures, which vehicles are present and active, and other performance and failure instances. For example, the interactive user display screen is helpful in determining which gates 31 are active to verify the necessary gates 31 are open to ensure evacuation of exhaust gases. In addition, the interactive user display screen 22 may view operational parameters such as the current particulate count and air quality information, such as information provided by the particulate counter 42, and system duct pressures as determined by diaphragm 26 and diaphragm switch 27, and the blower motor 38 current and voltage.

The events and vehicle storage memory 47 stores information from the control logic 45 relating to operational parameters such as pressure in the ducts, including desired operating pressure ranges, historical air quality and acceptable ranges of air quality, configuration of the variable speed motor drive, logs of the motor current and voltage, and operation counts, including if desired date and time of such operation counts, and acceptable operating rants for motor current and voltage, elapsed operating time, vehicle identifications, including the unique vehicle identification tag 52, and the network configuration and address, if so equipped.

Of course any additional information desired to be logged or used for comparison may be stored in the events and vehicle storage memory, for example, the time and date when a vehicle moves from one zone to another zone, such as leaving or returning to the facility or the premises of the facility.

The logic power supply 16 provides regulated DC and conditioned low voltage AC power to operate the circuitry and processors in the control logic 45 and for certain parts of the control system 40. Of course the specific outputs of the logic power supply 16 may vary depending on the desired configuration of the control logic 45, control system 40 and the available building power supply 8. The logic power supply may have a battery backup 24, and also be connected to a backup generator (not show) in addition to the normal power grid to which the building is connected. The building power supply 8 may include a safety master disconnect switch.

Figure 8:
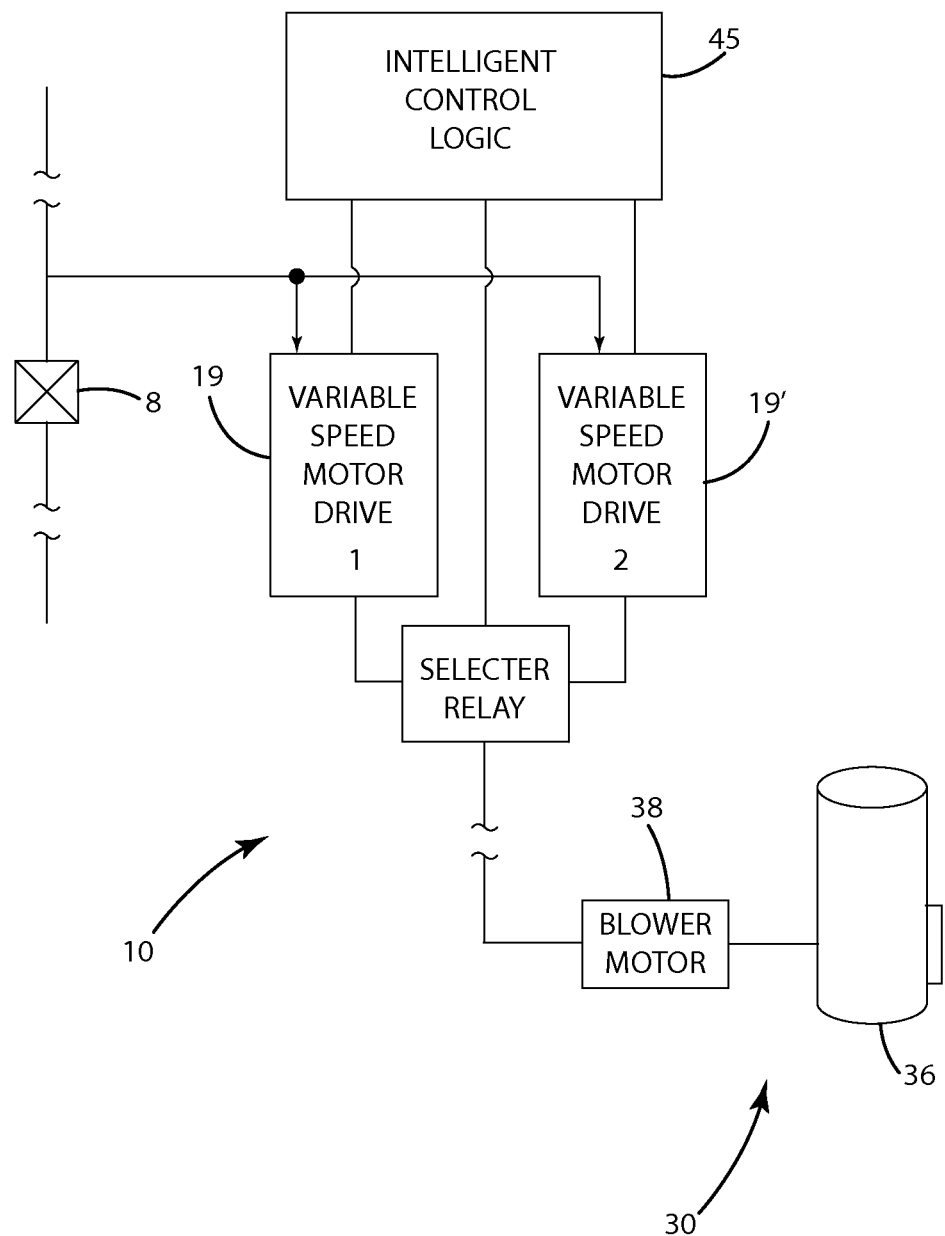
FIG. 8 illustrates a partial schematic diagram of a facility exhaust ventilation system having dual variable speed motor drives.
Figure 9:
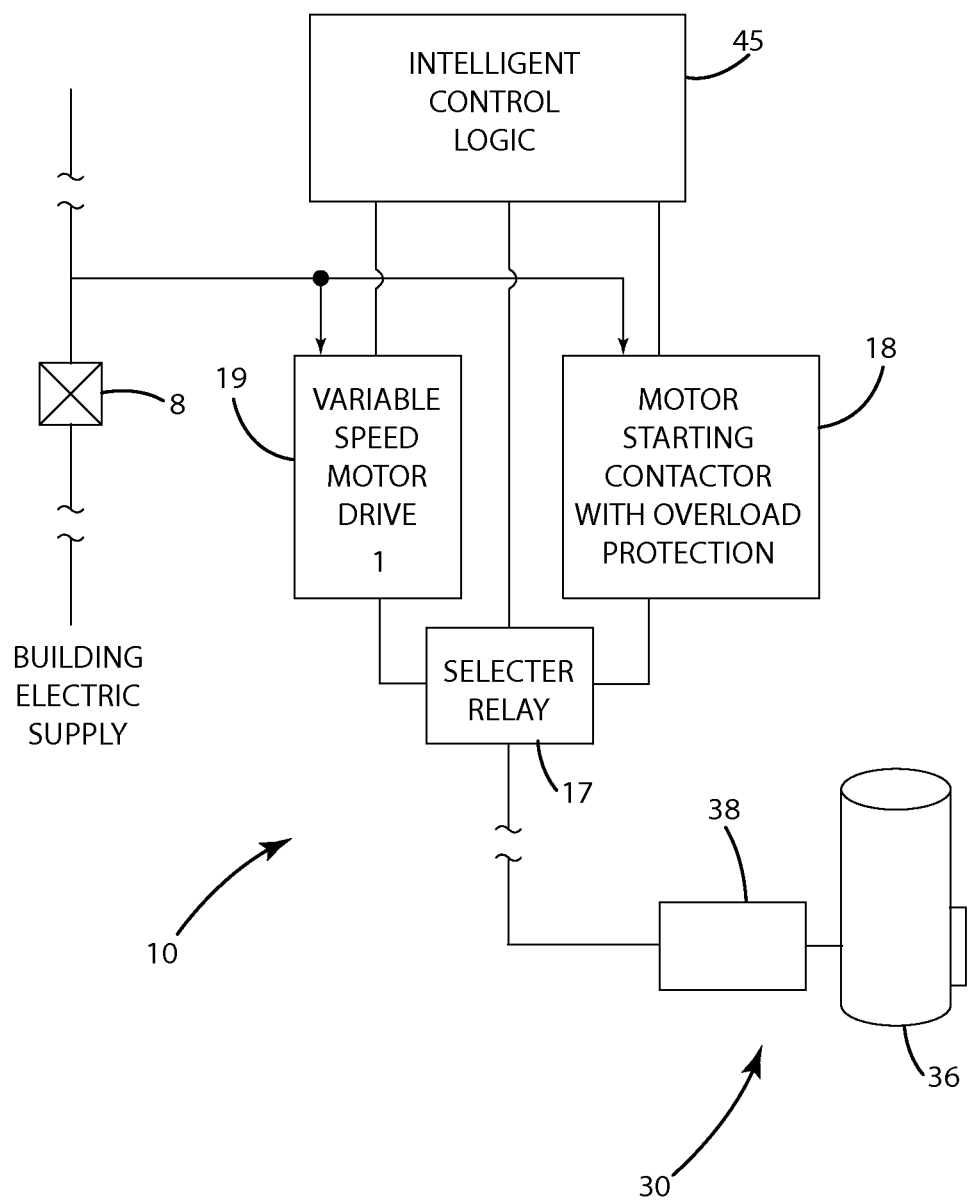
FIG. 9 illustrates a partial schematic diagram of a facility exhaust ventilation system having selectable variable speed motor drive and motor starting contactor.

The variable speed motor drive 19 is configured to drive the blower motor 38 of the blower 30, which in turn drives the fan, squirrel cage, impeller or the like 36 of the blower 30. The variable speed motor drive 19 accepts single or three phase electric power from the building supply 8 and outputs a variable frequency three phase AC that causes the blower motor 38 to operate at variable speed. The variable speed motor drive 19 communicates with the intelligent control logic 45 in order to receive start/stop/speed instructions in real time, and may provide real time speed voltage, current and speed information to the intelligent control logic 45. As illustrated in FIG. 8, two variable speed motor drives 19 and 19' may be used in combination with a selector relay 17. Using the two variable speed motor drives 19, 19' allows continued use in the event that one of them fails. In addition to redundancy, the motor drives 19, 19' may provide three phase output to a motor when only single output is available, which makes the redundancy important because the motor cannot be driven with a motor starting contactor directly. However, as further illustrated in FIG. 9 if three phase power input is available from the building supply, redundant operational backup is available at reduced cost through the use of a single variable speed motor drive 19 in combination with a motor starting contactor 18 with the selector relay 17. Therefore if the variable speed motor drive 19 fails, the selector relay may switch to the motor starter contactor 18 and continue operation of the system 10. The system as illustrated in FIG. 9 has reduced cost relative to the system illustrated in FIG. 8.

The analog and digital real world interface module 3 is used to connect sensors, such as the illustrated particulate counter sensor 42, diaphragm sensor 27, and voltage sensor 39 and the gate control 31. The sensors provide operational and safety performance feedback to the control logic 45 in real time. The analog and digital interface module 33 is illustrated as interfacing with air quality sensor 42, such as the illustrated laser particle counter. Of course multiple air quality sensors 42 may be used, and even different types of air quality sensors 42, such as particle count sensors and gas detection sensors. The analog and digital interface also may receive an input regarding motor current and voltage from a sensor 39, such as the illustrated voltage sensor and current transformer. The analog and digital real world interface 33 also may interface with a diaphragm or pressure switch 27, as illustrated in FIG. 7. The illustrated diaphragm switch is connected to a diaphragm 26 that measures pressure in the ducting 32. Of course multiple diaphragm sensors 27 may be used, such as one proximate to each vehicle 50, which also allows confirmation that a gate 31 is in the proper operational position.

The network interface 46 permits connectivity between the control system 40 and an external network, such as a facility intranet, a smartphone, a tablet 23 a computer 23', a display and the like to communicate vehicle status, and operational status of the system 10.

As illustrated in FIG. 8, a dual variable speed motor drive may be included, 19 and 19' in case one fails. A selector relay 17 is used to select which motor drive to use. The control system 40 directs selector relay 17 to connect the desired motor drive, 19 or 19', to the motor 38. In this manner, if a failure of a motor drive 19 or 19' is detected by the intelligent control logic 45, the other drive 19 or 19' may be connected in its place automatically to maintain exhaust ventilation system 10 operation. The control logic 45 may also regularly alternate which motor drive 19, 19' is used to balance elapsed time and wear and component aging.

Figure 10:
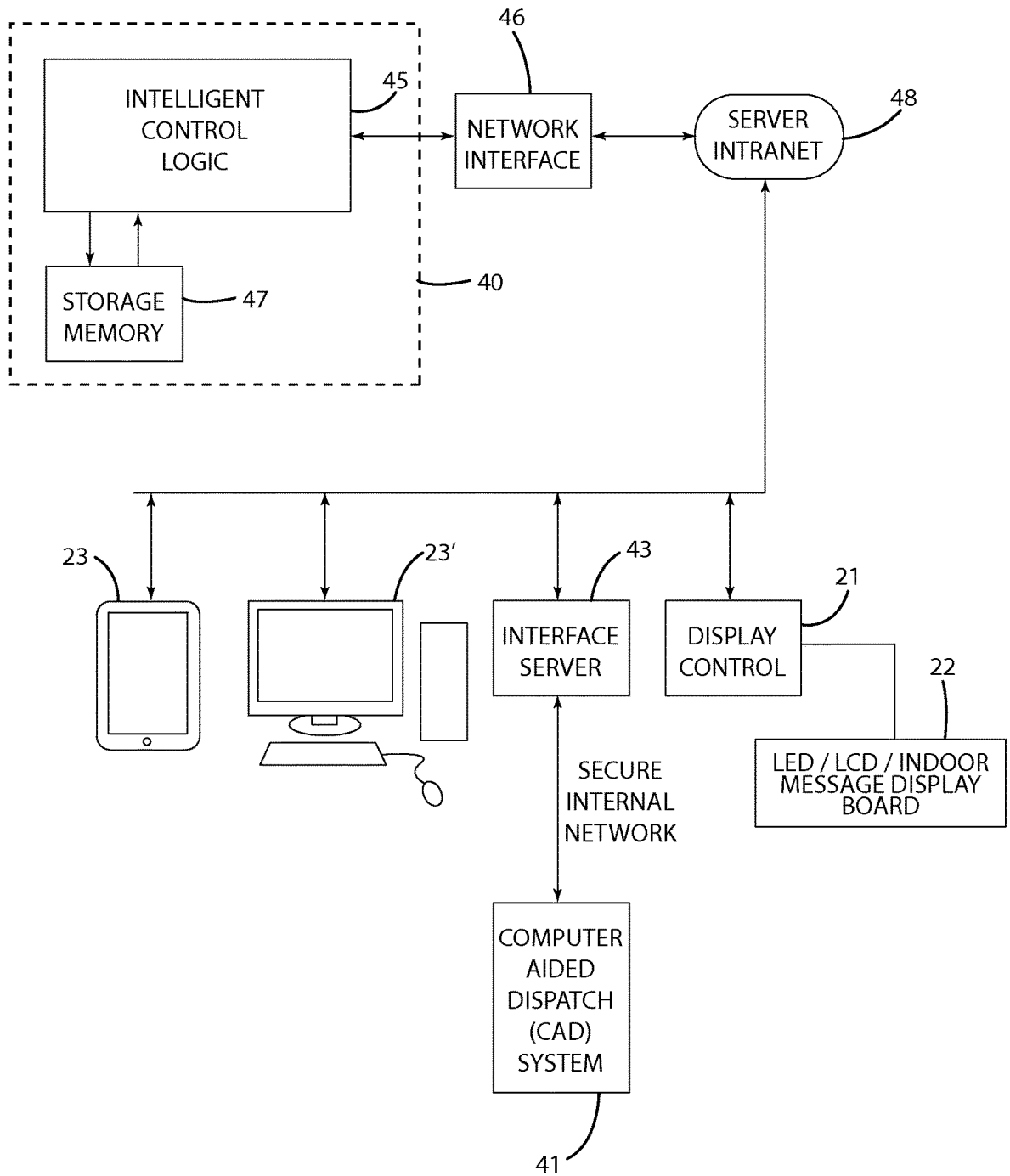
FIG. 10 illustrates a partial schematic diagram of the facility exhaust ventilation system and various optional interfaces.
Figure 11:
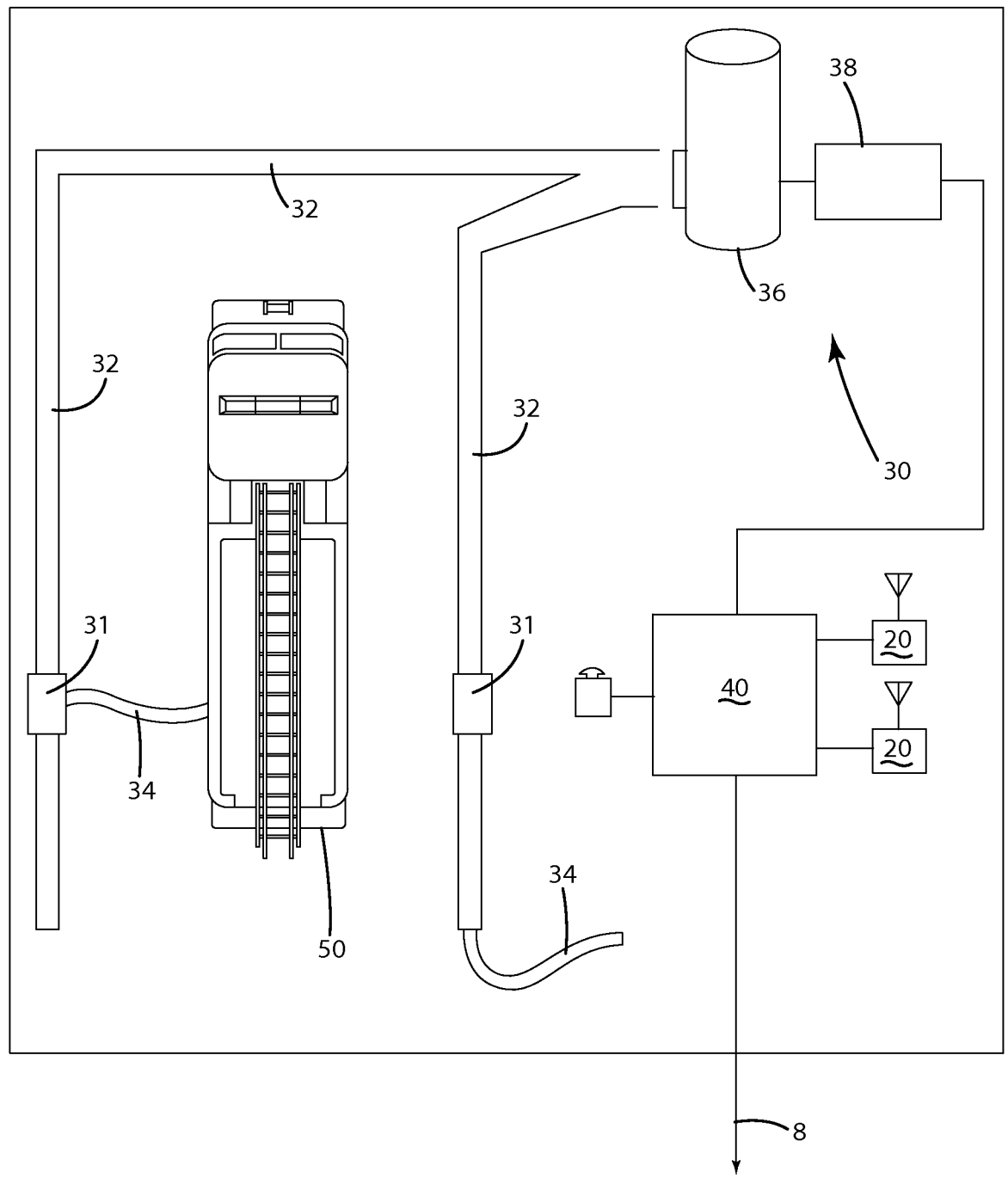
FIG. 11 illustrates an exemplary facility including the facility exhaust ventilation system.

As illustrated in FIG. 10, various other outputs of the control system 40, specifically such as the network interface 46, may be used to connect external devices, such as the illustrated tablet 23 and desktop 23'. The system 10 may also include an interface server 43 which interfaces with a computer aided dispatch system 41 to record vehicle response time and automatically update vehicle readiness information. As illustrated in FIG. 7, the message display board 22 may be operationally coupled to the control system 40 through a display controller 21.

An exhaust ventilation control system wherein a vehicle contains a transmitter device that communicates wirelessly with a receiving device located in a static facility does not provide a definitive means of determining the vehicle location beyond vague limits of wireless signal reception strength. An improved method of vehicle location is achieved by integrating additional inputs to the control system 40 of the facility exhaust ventilation system 10 with wired or wireless sensors within the facility itself or on the grounds of the premise containing the facility 2, such as an inductive driveway loop sensor 4 or other sensor to determine when a vehicle 50 has departed the facility premises. A further method of identifying which vehicles are authorized to interact with or activate the control system 40 of a specific static facility 2 implements a unique electronic identification signature, tag or label 52 which is transmitted to the static facility's receiving device 20 or read by the ID scanner 44. Of course, both methods may be used to ensure accurate identification of vehicles 50. The electronic identification tag 52 may contain information about the vehicle such as a vehicle registration number or assigned unit number. Since vehicles 50 are frequently moved between different static facilities 2 during normal operations, and may be housed in several different facilities within an organizational unit such as a municipality or military division, a human operator control over the electronic identification transmitted is required. A human input actuator such as a rotary or thumb wheel switch can be used to program, append, or change the data contents of the electronic identification tag or label transmitted to the static facility's receiving device. Of course, the human operator control may be situated in the facility 2 as part of the control system 40. The electronic identification tag 52 may be programmed or changed by manipulation of information stored in the vehicle and event memory 47 or by the computer aided dispatch system 41.

The present invention improves operation of the facility exhaust ventilation system 10, particularly the longevity and reliability of the motor 38 of the blower 30 by replacing or supplementing the mechanical contactor 18 with an electronic variable frequency drive 19, also commonly called a motor inverter. A variable frequency drive 19 is a sophisticated pre-packaged motor control device that is capable of starting and stopping a motor 38 connected to it, and can also vary the speed of the motor 38 by varying the frequency of the supply current to the connected motor 38. The variable frequency drive 19 can also be used to modulate the speed of the motor 38 which in turn changes how much air is moved by the blower 30 based on building-initiated and vehicle-initiated stimulus inputs to the control system 40. Motor speed modulation allows modification of the airflow through the blower 30, specifically modification of the amount of exhaust gases and air removed from the facility 2 in a given time period. As such, the flow rate of the system 10 can be adjusted to the number of vehicles 50 actively producing exhaust gases and particulate matter. If only one vehicle 50 is operating in a large building in a system sized for many vehicles, the blower 30 or exhaust fan could be operated at a slower or reduced speed, reducing the amount of conditioned air that is vented outside the building while still sufficiently evacuating vehicle exhaust. Of course, such a system would include gates 31 to shut intake from hoses 34 connected to nonoperational vehicles, or parking locations of vehicles not in the facility, to ensure the proper amount of air is removed by the desired hoses 34.

The hoses 34 may be hooked to the vehicles and use a separate magnetic system that provides feedback to the control system 40 that the hoses have been attached to a vehicle. More specifically, when the hose is attached at its end to the exhaust tailpipe of the vehicle, a magnet on the hose, permanent or electromagnet, may couple the hose to the vehicle. This allows the vehicle to easily drive away and for the hose to automatically disconnect in such a drive away situation.

Another benefit is that the variable frequency drive can also significantly extend motor and electrical equipment life by starting the motor gradually by reducing the in-rush current associated with motor start. Many variable frequency drive devices also contain protective circuits that monitor the input voltage supply and can be programmed to shut down and generate an alarm signal communicated back to the control system 40 in the event of an electrical supply deficiency. In some circumstances, variable frequency drive devices 19 may be configured to allow the use of three-phase motors in buildings where three-phase electrical supply is unavailable. In such situations, the variable frequency drive 19 is supplied with single-phase electrical supply, and synthesizes a stable three-phase supply for the connected motor.

Another benefit of a variable frequency drive 19 working in cooperation with the control system 40 of the exhaust ventilation system 10 is the simplification of the supply chain for the manufacture and installation of exhaust ventilation systems. More specifically, similar variable frequency drive devices 19 allow use of the same motor types for buildings with either single or three-phase electrical supply and the use of mechanically and electrically simpler electric three phase motors. Reduction in control system variations would also allow simplified design, documentation, training, and maintenance due the similarity of designs, and minimize customization at a particular facility to minor changes in control algorithms or configuration programming. The variable frequency drive is a complex, pre-packaged device and failure inside the device often requires replacement of the entire variable frequency drive device. The present invention allows for an alternate means of temporary operation in the event of variable frequency drive failure in facilities 2 with three phase power supply. In three-phase power supplies and motors, the system may contain an electromechanical contactor 18 in parallel with the variable frequency drive 19, to reduce. As there is no such direct equivalent for single-phase applications, in a single-phase application, the present invention allows a redundant variable frequency drive 19' to be supplied in parallel with the primary variable frequency drive device 19 as a backup. A dual redundant drive three phase implementation may also be used in three phase facilities offering enhanced redundant operation in even of a variable frequency drive failure.

As stated above, issues occur with transmitters in a vehicle being within range of a facility and causing undesirable nuisance operation. The present invention is situationally aware of the vehicles operating within its premises. The system of the present invention may create several activation zones, and use process logic to decide if a system activation of the exhaust ventilation system is required. For example, a facility may be configured to have three zones (although the number of zones may vary by application) with Zone 1—vehicle is inside the building structure; Zone 2—vehicle is outside the building structure but still on the premises; and Zone 3—vehicle is outside the building structure and outside the premises. Zone 1 and Zone 2 detections could make use of optical or range-limited radio frequency ("RF") transmission to notify the control system 40 of vehicle 50 presence within the building 2, such as in Zone 1, or outside the building 2, such as in Zone 2. Optical solutions may be a bar code or an infrared data link.

Range-limited RF solutions may utilize an inductive loop embedded in the floor or wall of the building adjacent to the target vehicle's parking location. Other RF solutions may make use of a passive RF identification tag, optical label or the like which is interrogated by an ID scanner 44, such as directional antenna or optical scanner mounted on the exterior of the facility, such as the door of the building at the time the vehicle passes into or out of the door.

Zone 3 detections could make use of the existing RF transmitter/receiver scheme, or use of a passive RF identification tag. An interrogation antenna could be located at the ingress/egress driveways to the premises. Due to the narrow range of activity, the RFID solution would reduce nuisance activations due to vehicle drive-by.

The vehicle proximity data may also be made available for external uses, including integration with automatic personnel dispatch systems, and a facility message display board, which may indicate the locations and engine run status of each vehicle on a particular premise or inside a facility 2.

As stated above, current exhaust system designs typically use a simple RF transmitter mounted in the vehicle communicating with a stationary receiver mounted in the building as the means of signaling the control panel to activate the exhaust system blower motor. While relatively low-cost and simple, the RF transmitters and receivers have a large and variable activation range. Vehicles can be tens to hundreds of feet from the building, and will still activate the system. This frequently results in nuisance activations of the exhaust system. Some vendors have attempted to reduce the nuisance activation issue by using a transmitter encoding scheme to associate specific transmitters with specific receivers. The encoding scheme and the actual encoded signal sent from the transmitter to the receiver is not accessible to the control panel, and the control panel is unaware which vehicle has sent a transmission. For example, a fire department with two fire station buildings, such as Station A and Station B, each with an exhaust ventilation system, might elect to program the vehicle transmitters for the vehicles normally housed at each building with codes unique to each building. The programming is achieved with switches hidden inside the transmitter device or with a manual transmitter/receiver training exercise. Thus, a vehicle from Station A traveling past Station B within range of the RF receiver would not activate Station B's exhaust system. Unfortunately, this creates a new nuisance, whereby transmitter modules must be manually swapped between vehicles if a vehicle normally housed at Station A is re-located to Station B. For environments with large numbers of buildings and vehicles, such manual swapping would be unacceptably tedious and time-consuming. An additional weakness of existing simple vehicle RF transmitter/receiver solutions is that they have a coverage range of thousands of square feet. It is not uncommon for a vehicle containing a transmitter to activate a building exhaust system receiver from over 500 feet away.

The present invention reduces the time spent manually swapping pre-programmed transmitters amongst vehicles by allowing easy operator changes, such as furnishing a thumbwheel switch accessible by the vehicle operator. The transmitters unique encoding identity transmitted could then be changed as desired by the vehicle operator simply by manipulating the switch. As such, the transmitter can change the facility association, by selecting different facilities. Other methods of changing the transmitter encoding identity could be implemented with a pair of momentary contact switches combined with a numeric readout, such as a digital LED readout, a backlit-LCD display, or a vacuum-fluorescent display. The thumbwheel approach is passive and permits viewing of the programmed value without electrically powering the transmitter.

A more sophisticated solution combines operator-programmable vehicle-initiated RF transmitters with a building exhaust ventilation system 10 control panel 40 that is proximity-aware of the vehicles 50 operating on the premises and within the facility 2 containing the exhaust ventilation system 10 it controls. Making an exhaust ventilation system 10 control system 40 aware of the operating status and physical location of each vehicle 50 on the premises or within the facility 2 represents a complex task. Multiple sensor types and communications methods are required to implement a reliable solution.

Figure 12:
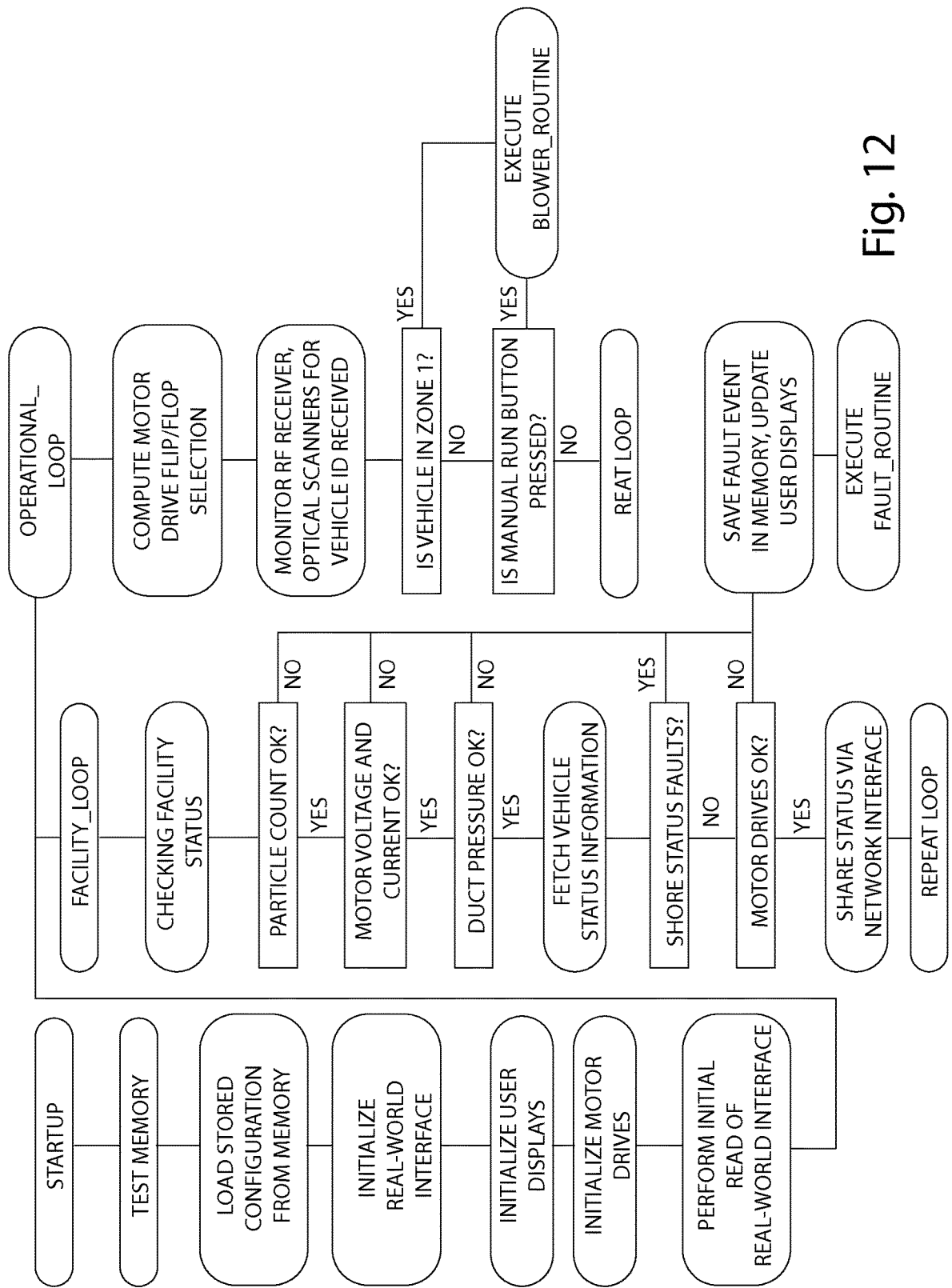
FIG. 12 illustrates flow chart of the logic steps of the present invention.

In order to assist the control system 40 with the exhaust system blower 30 activation decision, the control system 40 should be aware which vehicles 50 are requesting activation via RF transmission. Multiple vehicles may transmit exhaust system activation requests asynchronously and repetitively. The RF receiver functionality within the control panel or system 40 provides the vehicle identity information recovered from the received RF signals and uses the data to build a table of requesting vehicles. This table is used in the process logic implemented by the control panel to make exhaust system blower activation decisions. An example of the process logic is illustrated in FIG. 12. The typical facility 2 and premises associated with facility exhaust ventilation systems 10 can be classified into several distinct proximity zones. Based on the location of vehicles 50 within the proximity zones, the control panel 40 uses process logic, either through digital logic circuitry or by means of an algorithm implemented in software and executed by a supervisory microprocessor circuit within the control panel to decide if a system activation is required. The exemplary proximity zones are illustrated in FIG. 6 and classified as follows: Proximity Zone 1—Vehicle is inside the building structure; Proximity Zone 2—Vehicle is outside the building structure but still on the premises; and Proximity Zone 3—Vehicle is outside the building structure and off the premises. Detection of premise vehicles and classification of the vehicle within the various proximity zones produces raw data which is used by the control panel 40, along with vehicle-initiated RF transmitter signals, to determine if the building exhaust system blower 30 should be activated, and depending upon the number of active vehicles 50, along with other pre-configured parameters, the control system 40 determines the speed of the blower motor. As detailed above, the pre-configured parameters may be stored in memory 47. Proximity Zone 1 represents the indoor extents of a building. Because there are likely to be many vehicles parked or stored in a small physical area, simple RF remote-control transmitters with large coverage areas are impractical means for determining the specific location of a vehicle. A much-more limited range communications technique must be used that can be readily incorporated into existing building structures without excessive cost or introducing electromagnetic interference to existing radio communications equipment. In the majority of first-responder applications, vehicles located in a building structure 2 are parked in specific fixed locations, dictated by facility policy, space restrictions, and guidance markings on the facility walls or floor. Specific vehicles typically have dedicated parking locations which do not change. Repeated polling of the parking location for information about the presence or absence of a vehicle is required to determine which vehicles are in a building structure at a given time, and to determine additional vehicle characteristics. Several technologies can be used to achieve this polling implementation. The control system 40 may repeat the polling at desired intervals, or at the occurrence of stimulus, such as the detection of vehicle movement, identify the sound of a vehicle starting or running, a thermal sensor, or weight.

A passive RFID tag and a closely located interrogation antenna mounted near each of the parking locations within the building provides a tightly-targeted method of determining which vehicles are located at a specific parking location, and even in what space the vehicles are located, allowing control of the gates 31 relating to specific hoses 34 associated with specific locations. The identity data provided by the passive RFID tag is arbitrary and determined when the passive RFID tag is manufactured, however, it is assigned to the vehicle during programming of the control panel 40. An active RFID tag could be used to allow field programming of the tag data.

An alternative limited-range vehicle identity-detection scheme uses a direct line-of-sight optical data link between the vehicle and an optical receiver mounted near each of the parking locations within the building.

A second alternative limited-range vehicle identity-detection scheme uses a visible identification tag, such as passive reflective bar code on the vehicle surface. An LED, laser, or camera-based machine vision device to optically confirm the identity of a given vehicle in the parking place, by reading the visible identification tag 52 or even in some instances may visually identify the vehicle, without using any identification tags. In some instances the identification tag may be simply the applied number to the vehicle, such as the visible number applied to the police car, fire truck, ambulance or delivery vehicle, with the control system 40 being taught were to look for such number. Information about which vehicles are located inside a building structure 2 represents only a portion of the information needed to for the control panel 40 to make exhaust system blower activation decisions. Once a vehicle departs from its normal parking place, polling of the parking location will indicate the vehicle is not present. However, the vehicle may have been moved outside of the building, to another location within the building, or may no longer be transmitting information due to a failure or maintenance activity. Proximity Zone 2 represents the area immediately outside a building structure, such as a fire station parking lot and ingress/egress driveways. Vehicles, such as fire apparatus, are often staged outside the building structure for testing and maintenance or training exercises. Exhaust system 10 activation is not required for these vehicles 50 because they are outside the building, but they are still on the premises and within vehicle-mounted RF transmitter range.

Sensors, including ID scanner 44 may be located at the vehicle ingress/egress doors of the building structure may be used to determine that a vehicle is entering or leaving the building. Using the same RFID or optical technologies described above, information about vehicle movement is provided to the control panel logic as an additional data stream for the system activation decision algorithm. In addition, the vehicle movements may be shown on the display screen 22.

Using the same concepts set forth above, an additional set of sensors, including the inductive loops 22 or sensors 44 located at the vehicle ingress/egress driveways of the premises are used to determine that a vehicle is entering or leaving the outdoor area surrounding the building. This information is also provided to the control panel logic 45 as an additional data stream for the system activation decision algorithm, and made available to the computer aided dispatch 41. With all of the vehicle proximity information provided to the control panel logic 45, a supervisory circuit, including a microprocessor executing a software algorithm, maintains a table of vehicle identities, and the current real-time status of the vehicles. This table is used to make the final exhaust system blower activation decision, as well as gate 31 open or closed decisions.

This vehicle information is also of interest to human command, control, and supervisory staff, and is made available to external devices. The vehicle proximity data table can be accessed as simple ASCII plain-text data via a serial communications link. Real-time updates of system status, alarms, and other data are also accessible through the serial communications link. The data is also possible to make available through network interface 46 to external users, such as the computer aided dispatch system 41 or display 22

The vehicle status information may also be displayed on a digital display device, indicating the building or premise normally assigned vehicles, their status, including vehicle engine running, vehicle engine off, in service, out-of-service, mission-capable, not mission capable, outside the building, outside the premise, test mode, and other information. In addition, the digital display device may provide the ability to override exhaust system activation by a particular vehicle, and the ability to alter the configuration of the control panel operations.

Reliability is a significant concern for a building exhaust system 10 and its associated control panel 40. Vehicle proximity detection is subject to sensor failure, field programming errors, and unexpected vehicle placement during certain emergency conditions. The advanced vehicle proximity methods above are implemented within the control panel supervisory circuit 40 as a separate logic layer, and in the event of sensor failures or manually requested disablement, the separate logic layer is ignored and the control panel 40 will activate the exhaust system blower 30 based on the most simple stimulus input which is the reception of a signal from a vehicle RF transmitter with the appropriate code. Manual activation of the system by a control panel switch 40 must always override any other activation or deactivation stimulus inputs.

In addition, the present invention also may incorporate a quality control check to minimize human error effects as well as reduce incidents of accidently turning off the system or even flag system malfunctions. Current control solutions for exhaust ventilation systems provide no means to monitor the performance of the system and provide audible, visual, and remote alarms for reduced performance or failures of the system. Failures may include electrical supply issues, motor failure, blower clogging or failure, clogged inlet hoses, and building air pressure and air quality problems. Human error may include improper placement of hoses, pinched hoses, accidental or intentional shutoff of the system or vehicle transmitter as well as a host of other items. As particulate matter is strongly associated with occupational and workplace-related lung disease, the primary pollutant removed by most exhaust ventilation systems is particulate matter. A malfunctioning system therefore represents an immediate health risk, lung and other health problems to the occupants of the building, particularly if the failure is recurrent or continuous. The present invention may include a control system 40 that is in communication with the various sensors to detect blower failure, such as by a diaphragm switch 26/27, fan speed sensors or other system related sensors. The control system 40 may also be in communication with one or more air quality monitoring sensors 42 which may take periodic or continuous air quality measurements. For example, a laser particle counter may be included and notify the control system when interior particle counts exceed programmed thresholds. The program thresholds could cause the system to start, increase the volume of air being evacuated or even alert building occupants to a non-performing system. Common causes of elevated particle counts could include flexible exhaust hoses not properly connected to their target vehicle, or generation of dust or smoke via maintenance operations without proper use of a fume arm inlet. The performance alarms could then summon personnel to make appropriate investigations of the system and attempt to resolve the issue. The failures may also be logged so patterns of when failures occur could be determined and corrected. Present control solutions for exhaust ventilation system provide no way of measuring system usage, such as run time hours or activation counts. Such measurements are used by the present invention to alert operators regarding required maintenance of mechanical components like motor bearings and blower impeller blades, scheduling visual inspection of flexible hoses for wear or soot accumulation, and checking the rigid or flexible piping and manifold network. The measurements are built into the control system 40, and output visually or audibly to a user through improved control panels or software that includes an activations counter and a running time meter.

The system 10 may further include an air quality sensor 42 which may be a sensor such as a particle sensor or gas sensor. The air quality sensor 42 if a gas sensor may measure carbon monoxide, carbon dioxide, hydrogen sulfide and other components normally found in vehicle exhaust. It should be noted that the air quality sensor could also measure smoke, natural gas, methane and other hazardous gases. For example, an input from the gas sensor that a set threshold of gas levels is exceed is received by the control system, which may in response open the gates 31, including gates 31 associated with vehicles in a not running status. The system may then operate the blower as need, typically at or near maximum operational capacity until the gas level sensed is reduced below the set threshold. In addition, the control system may output an alarm status such that the cause of the exceeding gas levels may be investigated and eliminated.

The present invention and control system could be used in other applications as well. For example, proximity sensors or any sensors that may sense the proximity of a vehicle and then be used by the control system to determine the present of a vehicle or absences thereof may be used to turn off and on other types of equipment used in connection with vehicles. In addition, the control system may integrate additional features, such as detection of vehicle connection status. Example of a connection status would be when the vehicle is parked in a desired location with the proximity sensor or control system 40 determining it is parked in that location, shore power could be connected to the vehicle, and the power connection verified by the control system as properly operational. For example, with first responder vehicles, many of them contain numerous electronic devices and items that draw power from the vehicle's battery. When the vehicle is parked without the engine running, there is no way to internally charge or maintain the charge on the battery, and as such, the battery may draw down to a state where it is incapable of starting the vehicle. The reduction in battery performance is due to the power draw from such electronic devices, and if it occurs repeatedly, the battery may no longer function as intended. As a battery may drain quickly, depending on the level of power draw, leaving the vehicle disconnected from a shore power source may cause the vehicle to be inoperable when needed. As many first responder vehicles sit static for long periods of time until needed and contain numerous electrical items, a mission incapable vehicle is a serious problem. To address this problem, most vehicles in these facilities 2 are capable of being connected to the facility electrical system by shore power connection to maintain a charge. The system of the present invention may determine when the vehicle is in the desired location and static, and provide a warning if the vehicle is not drawing shore power from the facility electrical system to maintain its mission capable status. The system 10 may also be configured to detect other types of building to vehicle connections, such as whether an air hose is connected to maintain the air brakes. To determine if an air hose is connected to the vehicle, a pressure drop typically occurs which lets the system know the air hose has been connected. The warning may be an indicator lamp on the control system or other form of warning, or may include advanced warnings that are configurable to escalate after the vehicle has been static for a set time period. For example, once the system shuts off the exhaust ventilation system, such as for that particular vehicle, it may verify vehicle connection to a power source, and provide a warning until verification is received. The system 10 may also work with vehicles in cold climates that must be heated for an easy start, such as many diesel engines in first responder vehicles. While many first responder vehicles are housed in facilities, a number of others, such as commercial vehicles, maintenance vehicles, airport vehicles and the like are parked outside and need to be plugged into the facility electrical system to heat the engine block when not being used. As such, the system could warn an airport, a bus terminal, or delivery service if a vehicle parked overnight in a static location is not drawing power either to charge electrical items, or to heat the block to ensure ready operation. Furthermore, the system could control power draw by controlling the cycling off and on of the power provided to the vehicles based on outside temperature or other conditions.

The system 10 may also be configured to determine other issues, such as fluids under vehicles. For example, a machine vision system used to determine presence or absence of a vehicle in a parking spot may also detect the presence of liquid, such as oil, water, antifreeze and the like on the floor, all of which may affect the operational performance of the vehicle.

As illustrated in FIG. 12 and exemplary control logic of the control system 40, particularly the control logic 45 is provided, and is further detailed below as a series of steps.

(0) Start-up (Power first applied to system)
(1) Test event and vehicle storage memory
(2) Load system configuration from memory
(3) Initialize analog and digital real-world interface
(4) Initialize network interface
(5) Initialize user displays
(6) Initialize motor drives 19/19'
(7) Perform initial read of analog/digital real world interface values
(8A) Begin FACILITY_LOOP
  (a) Check Facility Status
  - GET CURRENT_CLOCK_DATETIME
  - GET VOLTAGE_MIN
  - GET VOLTAGE_MAX
  - GET DUCT_PRESSURE_MIN
  - GET DUCT_PRESSURE_MAX
  - GET FACILITY_PARTICLE_COUNT
  - GET DUCT_PRESSURE
  (b) IS particle count OK? NO - UPDATE USER DISPLAYS and save timestamped fault event in memory YES - continue
  (c) IS motor voltage OK? NO - go to FAULT_ROUTINE YES - continue
  (d) IS motor current OK? NO - go to FAULT_ROUTINE YES - continue
  (e) IS duct pressure OK? NO - go to FAULT_ROUTINE YES - continue
  (f) Fetch Vehicle Status Information
  - GET CURRENT_CLOCK_DATETIME INTERROGATE ALL PARKING POSITIONS SAVE ZONE_MEMBERSHIP for all vehicles in facility ZONE 1
  CHECK SHORE_STATUS for all vehicles SAVE SHORE_STATUS for all vehicles in facility ZONE 1 COMPARE SHORE_STATUS to saved configuration values CHECK for SHORE_STATUS fault exceptions
  (g) Shore status faults? YES - Update user displays and save timestamped faults in memory NO - CONTINUE
  (h) Check Drive 19 Status OK? NO - goto FAULT_ROUTINE YES - continue
  (i) Check Drive 19' Status, If not OK, goto FAULT_LOOP NO - goto FAULT_ROUTINE YES - continue
  (j) Share status information via Network Interface(k) repeat loop FACILITY_LOOP
(8B) Begin OPERATIONAL_LOOP
  (a) Compute drive select flip/flop value
  (b) Check for Vehicle Transmitter ID received
  (c) LOOKUP ZONE_1_VEHICLE_IDS
  (d) Is Received ID member of Zone 1? YES - GOTO BLOWER_ROUTINE NO - Determine zone of vehicle, save zone membership to memory, update displays
  (e) Is human interface/manual button pressed? NO - GOTO to OPERATIONAL LOOP YES - goto BLOWER_ROUTINE
  (f) Any fault conditions? NO - repeat loop OPERATING_LOOP YES - Save timestamped fault to memory, update user displays, repeat loop
BLOWER_ROUTINE
  (a) Fetch DRIVE_SELECT and enable selected motor drive or contactor
  (b) Begin run-time duration timer
  (c) Are there any critical faults? YES - disable selected motor drive, save timestamped fault event to memory, update user displays, output warning indications NO - continue
  (d) Time duration completed? NO - Go back to check critical faults YES - disable selected motor drive, save timestamped shutdown event to memory, update user displays, return
FAULT_ROUTINE -continued

```
(a) SAVE PARAMS EXCEEDING SAVED CONFIGURATION
VALUES
(b) CONSTRUCT ERROR MESSAGES
(c) SAVE TIMESTAMPED ERROR MESSAGES(d) ASSIGN
FAILURE_SEVERITY
(e) IS failure severe? NO - Send MESSAGES TO USER DISPLAYS
and CONTINUE OPERATING YES - SEND MESSAGES TO USER
DISPLAYS OUTPUT WARNING ALARM INDICATOR
(f) end, return.
```

It should be noted that operational steps 8A and 8B, as provided above are configured to occur at the same time, although in some instances they could be done in response to each other.

The invention claimed is:

1. A facility exhaust ventilation system installed in a facility for housing vehicles and configured to safely exhaust vehicle exhaust gases exiting an exhaust tailpipe of any vehicles running in the facility, the facility exhaust ventilation system comprising:
   a blower system having a motor and a fan unit driven by said motor and operationally coupled to at least one hose configured to attach to the exhaust tailpipe of the vehicle and wherein said blower system includes at least two variable speed motor drives and a selector, and wherein said motor is controlled by at least one of said variable speed motor drives, and said selector controls which of said two variable speed motor drives controls said motor at any given time;
   a receiver including an antenna configured to receive a wireless signal from at least one vehicle housed in the facility; and
   a control system receiving a signal from said receiver regarding an operational vehicle within the facility and wherein said control system includes an intelligent control logic in communication with said variable speed motor drives of said blower system and wherein said variable speed motor drives provide feedback regarding operational status of said variable speed motor drives to said intelligent control logic, and wherein said feedback includes an air quality sensor feedback, motor current feedback, motor voltage feedback, and air pressure sensor feedback.

2. The facility exhaust ventilation system of claim 1 further including an ID scanner.

3. The facility exhaust ventilation system of claim 2 wherein said ID scanner is at least one of a camera, laser scanner, optical scanner, or RFID scanner.

4. The facility exhaust ventilation system of claim 2 wherein said ID scanner is a camera system configured to sense a vehicle in a specified parking space.

5. The facility exhaust ventilation system of claim 1 wherein the control system includes an event and vehicle storage memory.

6. The facility exhaust ventilation system of claim 1 wherein the control system includes an analog and digital real world interface.

7. The facility exhaust ventilation system of claim 6 further including at least one particle counter in communication with said analog and digital real world interface.

8. The facility exhaust ventilation system of claim 6 wherein said blower system includes a blower and at least one hose, and the facility exhaust ventilation system further including at least one pressure sensor configured to sense pressure in ductwork between said blower and said at least one hose, in communication with said analog and digital real world interface.

9. The facility exhaust ventilation system of claim 6 further including a motor feedback sensor configured to provide feedback regarding at least one of current and voltage from a motor of said blower system.

10. The facility exhaust ventilation system of claim 1 wherein said control system further includes a network interface configured to communicate the operational status of the facility exhaust ventilation system with at least one of the internet, a secure intranet, smartphone, tablet, computer, or display.

11. The facility exhaust ventilation system of claim 1 wherein said intelligent control logic is in communication with at least one air quality sensor.

12. The facility exhaust ventilation system of claim 1 further including a display and a human interface, configured to receive operator input, including activation or deactivation of the blower system.

13. The facility exhaust system of claim 1 wherein said control system is configured to alternate said variable speed motor drives to balance elapsed time, wear, or component aging.

14. The facility exhaust ventilation system of claim 1 wherein said motor is controlled by said at least two variable speed motor drives and the control system uses said selector to control which variable speed motor drive is used at any given time to control said motor.

15. The facility exhaust ventilation system of claim 1 further including at least one induction loop.

16. The facility exhaust ventilation system of claim 15 wherein each parking spot in the facility includes an induction loop from said at least one induction loop.

17. The facility exhaust ventilation system of claim 15 wherein the facility includes one or more garage doors, and wherein an induction loop from said at least one induction loop is located proximate to each garage door so that as a vehicle passes by said induction loop in entering or leaving through said garage door, said induction loop is configured to sense the passage of the vehicle.

18. The facility exhaust ventilation system of claim 15 wherein the facility includes driveway entrances and exits between a facility parking lot and an adjoining street and wherein an induction loop from said at least one induction loop is located proximate to the driveway entrances and exits between the facility parking lot and the street such that a vehicle entering or leaving the parking lot must pass by said induction loop.

19. The facility exhaust ventilation system of claim 3 wherein said ID scanner is a laser scanner configured to read a bar code on said vehicle.

20. The facility exhaust ventilation system of claim 3 wherein said ID scanner is an optical scanner configured to read a number on the vehicle to identify which vehicle is operational.

* * * * *